United States Patent
Robinson et al.

(10) Patent No.: US 7,123,925 B2
(45) Date of Patent: Oct. 17, 2006

(54) METHOD AND APPARATUS FOR LOCATING DEVICES

(75) Inventors: David P. Robinson, Ipswich (GB); Ian W Marshall, Woodbridge (GB)

(73) Assignee: British Telecommunications public limited company, London (GB)

(*) Notice: Subject to any disclaimer, the term of this patent is extended or adjusted under 35 U.S.C. 154(b) by 71 days.

(21) Appl. No.: 10/518,239

(22) PCT Filed: Jun. 18, 2003

(86) PCT No.: PCT/GB03/02608

§ 371 (c)(1),
(2), (4) Date: Dec. 21, 2004

(87) PCT Pub. No.: WO03/107595

PCT Pub. Date: Dec. 24, 2003

(65) Prior Publication Data

US 2005/0233748 A1 Oct. 20, 2005

(30) Foreign Application Priority Data

Jun. 18, 2002 (EP) ................... 02254243
Jul. 26, 2002 (EP) ................... 02255255

(51) Int. Cl.
*H04Q 7/20* (2006.01)
*H04B 7/00* (2006.01)
(52) U.S. Cl. .............. 455/456.1; 455/41.2; 455/456.5
(58) Field of Classification Search ............ 455/456.1, 455/41.2, 456.5
See application file for complete search history.

(56) References Cited

U.S. PATENT DOCUMENTS

2002/0045455 A1 4/2002 Spratt .................. 455/456

(Continued)

FOREIGN PATENT DOCUMENTS

EP 1039689 A 9/2000

OTHER PUBLICATIONS

PCT International Search Report.

(Continued)

*Primary Examiner*—Erika A. Gary
*Assistant Examiner*—Marisol Figueroa
(74) *Attorney, Agent, or Firm*—Nixon & Vanderhye P.C.

(57) ABSTRACT

A method of obtaining positional information about individual wireless devices a1–a16, r1–r125 within a wireless ad-hoc network including a plurality of position determining devices r1–r125 which include means for estimating the distance between themselves and other similar devices which are within range. The method includes the steps of: calculating the hypothetical distance between a respective node's estimated position and the estimated position of each of its neighbouring devices whose broadcast estimated position has been received and whose distance from the respective node has been measured comparing the calculated hypothetical distance with the measured distance; modifying the respective node's estimated position so as to reduce an error function dependent upon the difference between the hypothetical and measured distances and periodically resetting the respective node's estimated location to a new position in a manner which does not seek to reduce the error function within a single iteration so as to avoid the location from getting stuck in a local minimum value of the error function.

9 Claims, 14 Drawing Sheets

U.S. PATENT DOCUMENTS

2003/0191604 A1* 10/2003 Kuwahara et al. .......... 702/150
2004/0109417 A1* 6/2004 Castro et al. ............... 370/238
2004/0203380 A1* 10/2004 Hamdi et al. .............. 455/41.2
2004/0203872 A1* 10/2004 Bajikar .................... 455/456.1
2004/0203904 A1* 10/2004 Gwon et al. ............. 455/456.1

OTHER PUBLICATIONS

Savarese et al., "Robust Positioning Algorithms for Distributed Ad-Hoc Wireless Sensor Networks", USENIX Technical Conference, XX, XX, Jun. 2001, pp. 317-327, XP002225742.

Savarese et al., "Location in Distributed Ad-Hoc Wireless Sensor Networks", 2001 IEEE International Conference on Acoustics, Speech, and Signal Processing, Proceedings, Salt Lake City, UT., May 7-11, 2001, IEEE International Conference on Acoustics, Speech, and Signal Processing, New York, NY, IEEE, US, vol. 4 of 6, May 7, 2001, pp. 2037-2040, XP002225743.

* cited by examiner

METHOD AND APPARATUS FOR LOCATING DEVICES

This application is the US national phase of international application PCT/GB03/02608 filed 18 Jun. 2003 which designated the U.S. and claims benefit of EP 02254243.5 dated 18 Jun. 2002 and EP 02255255.8 dated 26 Jul. 2002, the entire content of which is hereby incorporated by reference.

TECHNICAL FIELD

The present invention relates to a method and apparatus for locating devices. It particularly relates to locating relatively simple and inexpensive devices which have the ability to communicate with one another in a wireless manner, provided the devices are located sufficiently close to one another to be "in range", when such devices are located with a sufficiently high distribution density that the devices are able to form an "ad-hoc" network by which the devices may communicate with one another and with external devices having an appropriate connection to the wireless ad-hoc network.

BACKGROUND TO THE INVENTION AND PRIOR ART

Wireless ad-hoc networks, which are self-organising, rapidly deployable and which require no fixed infra-structure since they are made solely (or at least largely) of self-contained wireless devices, are known and have been the subject of considerable research in recent times. However, such networks as proposed heretofore have been restricted in their approaches to obtaining positional information about individual devices within the network. In the main, three different types of approach have been adopted: approach 1 is simply not to provide positional information about individual devices within the network; approach 2 is to rely on such information being known a priori (eg by having been carefully placed in pre-ordained positions) and not being liable to change in an unpredictable manner; approach 3 is to use devices which include Global Positioning Systems (GPS's). In certain applications for such networks however, none of the above approaches is ideal. For example, in an application for sensing ocean conditions using an ad-hoc network of free floating sensors the first approach is not ideal because the sense data from each sensor is only valuable if accompanied with the position of the sensor at the time the data was recorded; the second approach is not tenable because the sensors will move with the ocean currents in an unpredictable manner (even assuming their initial placement was known); and the third approach is non-ideal because of the expense of supplying each sensor with a GPS.

In "GPS-free positioning in mobile ad hoc networks" by Srdjan Capkun, et al., Cluster Computing, Volume 5, #2, April 2002 the authors describe an algorithm for permitting devices within a wireless ad-hoc network to obtain relative positional information without the use of any GPS containing devices, using only information about the distances between devices in range of one another (which information, it is said, can be found using a Time of Arrival (TOA) or similar range finding method). The paper mentions that the relative positional information could be associated with a geographical coordinate system only "if the algorithm is used along with some GPS-capable devices." However, it does not mention how this would be done. It also points out that for some applications (of particular concern to the authors) purely relative positional information is sufficient. The main drawback with the proposed method is that it does not scale well to large systems. The number of communications that each node is required to make increases as the number of nodes in the network increases. This means that beyond small networks the time needed and the processor power required becomes restrictive. Additionally, the calculations required of each device to execute the described algorithm are relatively arduous for very simple devices and therefore likely to be costly in terms of power consumption; additionally, the complexity has a negative impact on the speed with which the relative positions of the devices can be recalculated in the event of movement of the devices.

An alternative approach has also been considered in the field of ad-hoc wireless networks which, however, involves the use of base-stations for location purposes. In this approach (which may be thought of as a semi-ad-hoc semi-cellular approach) simple devices are able to communicate with one another to navigate data through the network (rather than just communicating with base stations as in purely cellular systems), but use only the base stations for location determination purposes (ie they do not attempt to determine their location from the locations of neighbouring simple devices only from neighbouring base stations). This approach has the disadvantage that a relatively large number of the more expensive base stations are required throughout the network.

Yet a further alternative approach has been described by Chris Savarese and Jan Rabaey in two recently published papers (SAVARESE C ET AL: "Robust Positioning Algorithms for Distributed Ad-Hoc Wireless Sensor Networks" USENINX TECHNICAL ANNUAL CONFERENCE, PAGES 317–328, MONTEREY, Calif., JUNE 2001, XP002225742; and SAVARESE C ET AL: "Locationing in Distributed Ad-Hoc Wireless Sensor Networks" 2001 IEEE INTERNATIONAL CONFERENCE ON ACOUSTICS, SPEECH, AND SIGNAL PROCESSING. PROCEEDINGS (CAT. NO. 01CH37221), SALT LAKE CITY, Utah, USA, 7–11 MAY 2001, pages 2037–2040 vol. 4, XP0022257432001, Piscataway, N.J., USA, IEEE, USA, ISBN: 0-7803-7041-4). These papers describe a sophisticated and robust two stage method for locating devices in a wireless ad-hoc sensor network in which a small proportion only of the devices are position aware (so called anchor nodes, which correspond to the "gps" or "a priori" nodes referred to in this document). The first stage of the algorithm involves a series of communications spreading out from the anchor nodes by which each (non-anchor) node determines how many hops it is removed from each anchor node. An approximate average distance of each hop is then calculated from knowledge of the shortest number of hops between each pair of anchor nodes and the distances between each pair of anchor nodes (eg if anchor nodes A and B have a shortest path between them of 5 hops and are located at positions (0,0) and (0,10) according to some arbitrary but fixed global coordinate system, then each hop can be attributed an average size of 10/5=2 units). By ensuring that there are at least three anchor nodes, and each node knows its shortest path (in terms of number of hops) to each of at least three anchor nodes, it is able to calculate an approximate location for itself. The second stage of the algorithm then iteratively refines these approximate locations by having each node broadcasting its own most recently calculated position to its neighbouring nodes together with a measure of "confidence" (which varies between 1 and 0) in the accuracy of the broadcast position (with anchor nodes having a confidence of 1 and other nodes having an initial confidence of 0.1). Thereafter, non-anchor nodes update their positions by attempting to triangulate from the received broadcast positions of their immediate neighbours from whom they have also determined a range measurement and assign a confidence to their position updated in this manner which is the average of the confidences assigned (and broadcast) by their immediate neighbours. The iterative procedure is repeated a predetermined number of times and then stopped. Nodes which still have a low confidence in their position are disregarded.

Whilst the above described location method of Svarese et al. is quite sophisticated and robust, it would be desirable to provide an improved method which is just as robust but which has improved performance in terms of both the accuracy with which nodes are able to locate themselves and the proportion of nodes which are able to determine their position with a high level of confidence.

SUMMARY OF THE INVENTION

According to a first aspect of the present invention, there is provided a method of obtaining positional information about individual wireless devices within a wireless ad-hoc network including a plurality of position determining devices in which each position determining device includes means for estimating the distance between itself and any other similar device forming part of the network which is within range, the method including the steps of:

i) each position determining device receiving a broadcast message from each other similar device in range specifying, if known, the respective broadcasting device's position or an estimated position;

ii) each position determining device attempting to measure its distance from each other similar device in range;

iii) each position determining device determining its actual position or an initial estimated position and storing this information;

iv) each position determining device which does not know its actual position calculating the hypothetical distance between its estimated position and the position or estimated position of each neighbouring device whose broadcast position or possible position has been received and whose distance from the respective node has been measured in step ii);

v) each position determining device which does not know its actual position comparing the hypothetical distance calculated in step iv) with the distance measured in step ii);

vi) each position determining device which does not know its actual position, modifying its estimated position so as to reduce an error function dependent upon the difference between the hypothetical and measured distances and vii) each position determining device broadcasting to each other similar device in range, if known, its actual position determined in step iii) or its modified estimated position determined in step vi).

This method works very well where the ad-hoc network includes a small-percentage of devices which have some initial knowledge about their position. This may, for example, be achieved either by having some devices placed in fixed known locations or by having some devices which include a GPS. Since only a small fraction of the total devices used need to be specially treated in this way, there is only a very small overall cost increase compared to a network in which none of the devices are specially treated in this way.

Note that steps (i) and (ii) may be performed in any order (or even simultaneously or in an overlapping or interleaved way, and may be different for different devices).

Preferably, the above described steps are repeated on a regular basis. However, in some applications the devices will remain in fixed locations and it is not therefore necessary to repeat all of these steps at each repetition or iteration. For example, in such a circumstance the relative distances between neighbouring nodes would only need to be determined once. Also, once a device has identified its actual position it will only need to repeat the final step (vii), and this only until all of its neighbouring devices have successfully received its broadcast positional information, unless of course the device moves or a new neighbour comes into range, or it determines a new estimated position, etc. provided, as occurs in a preferred embodiment, each device assumes that its neighbours are still in the same place provided they can maintain contact with them if they have not received an updated estimated position from them. In a preferred embodiment, each device may decide after a certain length of time, or number of iterations, or upon some other condition being met, to reduce the frequency with which it carries out this procedure so as to conserve power, etc.

Thus one embodiment of the invention takes a wireless ad-hoc network of nodes that each have a set range of communication. Within this network some nodes have information about their location (it is envisaged that each of these is either carefully placed and fixed at a certain location or belongs to a small sub-set of more expensive devices each of which is equipped with a GPS receiver). The nodes in the network then determine their distance to other neighbouring nodes that are within range of communication (exactly how would depend on the environment that they are in but something along the line of sonar or radar is envisaged). It is possible for a node that does not know its location, but is within range of at least one other node that does know its location (or an estimated location), to determine that it is located at some point on the circle surrounding the neighbouring node whose radius is equal to the measured distance from the respective neighbouring node. As an initial estimate (or guess) the node randomly picks any point on the circle. This initial estimate is then iteratively modified according to an algorithm which seeks to minimise the difference between the measured distances between neighbouring nodes and the hypothetical distances calculated using the current estimations of the positions of the nodes. The present embodiment thus allows nodes to effectively locate themselves relative to each other in a very low-cost fashion, and then use partial information about their absolute position to enable a proportion of nodes in the network (seemingly dependent on the density of nodes in the network) to locate themselves accurately and absolutely. It applies to both fixed (non-moving) and fully mobile networks equally, with mobile networks effectively re-calculating the nodes' positions at regular intervals.

Preferably, the network includes at least three devices which have a priori knowledge about their position (or their possible positions). Note it is not necessary that at least two devices which have a priori knowledge about their position are located sufficiently close together for both devices to be simultaneously in range of a third device.

In one preferred strategy for distributing the devices of the network, there are a small number (approximately 5–10%)

of 'gps' devices (ie devices having a priori positional information) that are either in planned locations or are distributed so that there are very few redundant devices giving excess information to nodes that don't need it. In another preferred strategy, there is a larger number (maybe as high as 25%) of gps devices that are completely randomly distributed in exactly the same way as the other non-gps devices. In both cases there is a degree of trade-off, the denser the network (i.e. the greater the number of devices that have no information about their initial location) the lower the number of 'gps' devices that are required.

In a preferred embodiment, all of the devices are position determining devices in the sense that they will each attempt to identify their position based on the information broadcast to them from neighbouring devices in the network together with range information determined using whatever distance detection mechanisms they possess. However, the possibility of including certain devices which form part of the network but which make no effort to determine their own position is not excluded. Similarly, for the purposes of this specification, devices which have some a priori knowledge about their position (and thus do not need to determine their position according to the above set out method) are intended to be covered by the term "position determining devices."

In one embodiment, when each device first generates an estimated position, if it has information from more than one neighbouring device, it will use information from the neighbouring nodes according to the following order of priority: neighbouring nodes which say they know their actual position have highest priority, thereafter neighbouring nodes, which have broadcast an estimated position, have priority according to the measured distance of the neighbouring node from the respective determining node, with closer nodes having higher priority than more distant nodes. Where it is possible for an estimated position to satisfy the constraints set by more than one neighbouring node (ie where the circles, which are centred around the respective broadcast positions of the neighbouring nodes and have radiuses equal to the measured distance to the respective neighbouring nodes, coincide or overlap in one or more positions), then such an estimated position will be selected as the initial estimated position. In certain embodiments, when a device, after having already determined an initial estimated position (and possibly also having modified the initial estimated position one or more times), subsequently receives a broadcast of an actual or estimated position from a neighbouring node which is within range and which has a higher priority than the node or nodes whose broadcast information was originally used to determine its initial estimated position, it re-determines its "initial" estimated position using the information newly received from the higher priority node.

Preferably, the error function, which is dependent upon the difference between the hypothetical and measured distances, is dependent upon the sum of the squares of the differences between each measured and each hypothetical distance between a respective node and its nearest neighbours (ie for a node i having near neighbours 2, 3 and 4 the error function which node i seeks to minimise is:

$$E = \sum_{j=2}^{4} (md_{ij} - hd_{ij})^2$$

Where $md_{ij}$ is the measured distance from node i to node j and $hd_{ij}$ is the hypothetical distance from node i to node j).

Preferably, each device includes a resetting algorithm the purpose of which is to avoid the device from getting its position estimation "stuck" in a local minimum of the error function. Such local minima in the error function often occur at locations approximately symmetrically opposite the actual position of the device with respect to a line connecting together two neighbouring nodes with respect to which the device is attempting to position itself. Preferably therefore, the resetting algorithm causes the reset estimated position to be approximately a mirror reflection of its current estimated position with respect to a line connecting the broadcast (actual or estimated) positions of the closest pair of neighbouring nodes which have broadcast their (actual or estimated) positions.

Preferably, the resetting algorithm considers one or more of the following parameters when deciding whether or not to reset its estimated position: the value of the error function calculated in respect of the current estimated position, both when compared to the average value for the error function during all preceding iterations and as an absolute value, the number of times the estimated position has been modified without resetting and how recently a neighbouring node has performed a reset.

In order to optimally deal with the case where the devices are moving relative to one another, each device preferably maintains a record of the number of neighbours which it has at any one time. In the event that this number changes between iterations, which is thus indicative of a former neighbour moving out of range or a former non-neighbour moving into range, the device which detects this change preferably reacts by inhibiting any resetting for a certain number of iterations. In the currently preferred embodiment, the number of iterations, after detecting a change in the number of neighbours, for which a reset is inhibited is one.

Preferably, each device (apart from those which have some a priori knowledge of their position from a reliable source) maintains a plurality of possible or estimated positions in parallel with one another, each of which may be referred to by an index (eg if three possible positions are maintained in parallel these may be referred to as $r_1$ $r_2$, $r_3$). Preferably, each parallel position is updated using the corresponding parallel positions broadcast by its neighbouring devices (eg $r_1$ of Node 1 is updated using r, of Nodes 2, 3 and 4). When the device is required to provide a single position (eg for position stamping data, etc) it preferably calculates the mean position of all of the parallel stored possible positions. Additionally, the device preferably transmits an estimated maximum positional error which is calculated in such a way that it depends upon the variance between the different parallel stored possible positions.

In a preferred embodiment, the estimated maximum positional error is calculated as follows (for a two-dimensional environment, the extension to three dimensional environments being obvious):

Error=((Max $x$–Min $x$)+(Max $y$–Min $y$))/2

(with Max x=Max ($x_1$, $x_2$, $x_3$), $r_1=x_1 i+y_1 j$, i and j being unit vectors in the x and y directions respectively, etc.)

By analogy with the well known technique of simulated annealing, the present procedure can be thought of as a type of local-knowledge-only simulated annealing technique in which the algorithm can be considered as minimising the energy of the system (where the energy of the system is the sum of the energies of the individual components and each individual component's energy depends, in the present example application, on how far away from its real position it thinks it is). The difference between this method of the present invention and conventional simulated annealing is that this method does not require a global measure of total energy to be available.

As an example of a very different field to which this procedure could be applied, consider the following problem:

There is a set (large) number of stars in certain positions to be photographed. A telescope must decide what is the best path between stars so that every star is photographed and the minimum total "distance" is travelled. This is a version of the well known 'travelling salesman' problem. Basically the approach using the present procedure would be, pick a star, go to that star, photograph it, pick another star that hasn't been photographed, repeat. What the procedure would do would be to minimise the distance (energy) between successive stars. i.e. the algorithm would choose the star nearest to it which hadn't already been photographed. In this way the algorithm would have no knowledge of the global energy (i.e. the total distance travelled), but only the local energy (i.e. distance from star A being photographed to star X). The reset clause would come in where a star was reached and it had no stars within a suitable distance to move on to, at that point it would be returned to the previous star in the sequence and told to select a different star.

Further preferred features of the first aspect of the present invention are set out in the claims dependent upon claim 1.

According to a further aspect of the present invention, there is provided a method of obtaining positional information about individual wireless devices within a wireless ad-hoc network including a plurality of position determining devices in which each position determining device includes means for estimating the distance between itself and any other similar device forming part of the network which is within range, the method including the steps of:

i) each position determining device receiving a broadcast message from each other similar device in range specifying, if known, the respective broadcasting device's position or series of possible positions;

ii) each position determining device attempting to measure its distance from each other similar device in range;

iii) each position determining device calculating, if it has sufficient information, its position, or a series of possible positions and storing this information; and iv) each position determining device broadcasting to each other similar device in range, if known, its position or series of possible positions determined in step iii.

This method works very well where the ad-hoc network includes a small percentage of devices which have some initial knowledge about their position. This may, for example, be achieved either by having some devices placed in fixed known locations or by having some devices which include a GPS. Since only a small fraction of the total devices used need to be specially treated in this way, there is only a very small overall cost increase compared to a network in which none of the devices are specially treated in this way.

Note that steps (i) and (ii) may be performed in any order (or even simultaneously or in an overlapping or interleaved way, and may be different for different devices).

Preferably, the above described steps are repeated on a regular basis. However, in some applications the devices will remain in fixed locations and it is not therefore necessary to repeat all of these steps at each repetition or iteration. For example, in such a circumstance the relative distances between neighbouring nodes would only need to be determined once. Also, once a device has identified its actual position it will only need to repeat the final step (iv), and this only until all of its neighbouring devices have established their own locations, or the network decides that no further elimination of incorrect possible locations can be removed because of the particular distribution of the devices within the network.

Thus one embodiment of the invention takes a wireless ad-hoc network of nodes that each have a set range of communication. Within this network some nodes have information about their location (it is envisaged that each of these is either carefully placed and fixed at a certain location or belongs to a small sub-set of more expensive devices each of which is equipped with a GPS receiver). The nodes in the network then determine their distance to other neighbouring nodes that are within range of communication (exactly how would depend on the environment that they are in but something along the line of sonar or radar is envisaged). By solving trigonometric equations, it is possible for a node that does not know it's location, but is within range of two nodes that do know their location, to solve the equations of circles and determine that it is located in one of two possible locations. This information can then propagate through the network allowing other nodes to determine their position to one of several locations. When positional information from other nodes also propagates through the network it becomes clear that some of the possible positions for a node of unknown location are inconsistent with all the data. The nodes thus discard these inconsistent positions to leave fewer possible positions and in some cases 1 possible position, which is the correct location of the node. The present embodiment thus allows nodes to effectively locate themselves relative to each other in a very low-cost fashion, and then use partial information about their absolute position to enable a proportion of nodes in the network (seemingly dependent on the density of nodes in the network) to locate themselves accurately and absolutely. It applies to both fixed (non-moving) and fully mobile networks equally, with mobile networks effectively re-calculating the nodes' positions at regular intervals.

Preferably, the network includes at least three devices which have a priori knowledge about their position (or their possible positions) at least two of which are located sufficiently close together to be in range of a third device.

In one preferred strategy for distributing the devices of the network, there are a small number (certainly <10%, sometimes as low as □5%) of 'gps' devices (ie devices having a priori positional information) that are either in planned locations or are distributed so that there are very few redundant devices giving excess information to nodes that don't need it. In another preferred strategy, there is a larger number (maybe as high as 25%) of gps devices that are completely randomly distributed in exactly the same way as the other non-gps devices. In both cases there is a degree of trade-off, the denser the network (i.e. the greater the number of devices that have no information about their initial location) the lower the number of 'gps' devices that are required.

By the term possible positions, or series of possible positions, it is meant that one of the possible positions is the actual position of the device (within a certain margin of error) but the device does not (at that particular time at least) know which of the possible positions is the correct one.

In a preferred embodiment, all of the devices are position determining devices in the sense that they will each attempt to identify their position based on the information broadcast to them from neighbouring devices in the network together with range information determined using whatever distance detection mechanisms they possess. However, the possibility of including certain devices which form part of the network but which make no effort to determine their own position is not excluded. Similarly, for the purposes of this specification, devices which have some a priori knowledge about their position (and thus do not need to determine their position according to the above set out method) are intended to be covered by the term "position determining devices."

BRIEF DESCRIPTION OF THE DRAWINGS

In order that the present invention may be better understood, embodiments thereof will now be described, by way of example only, with reference to the accompanying drawings in which.

DETAILED DESCRIPTION OF EMBODIMENTS

Part 1: FIGS. 1 to 8

The first embodiment to be described is of a small wireless ad-hoc network comprising twelve position determining devices, only three of which contain GPS's, and which are able to determine the position of most of the devices within six iterations of the position determining algorithm described below. The described embodiment, comprising only twelve devices, could be used for monitoring a small body of water. However, it will be apparent to a person skilled in the art that the described embodiment could easily be scaled up for use in monitoring a very large body of water such as a sea or ocean, by including many more simple devices (no more of which would, in theory, require in-built GPS's).

In overview, in the present example embodiment, three of the devices include GPS's and these broadcast their location at the first step of each of the required six iterations. At approximately the same time, each of the other devices determines its distance from each other device with which it is in range. Using this information, at each iteration each device attempts to identify its location or a series of possible locations and then broadcasts such locations or possible locations at the start of each subsequent iteration. As devices begin to receive more information about possible positions of their neighbouring devices, they are firstly able to generate a series of possible positions themselves and then are able to eliminate impossible positions until after only six iterations in the present example, six of the nine devices which originally had no information about their whereabouts identify their exact position, one narrows down the possibilities to one of two possible positions and the remaining two narrow down the possibilities to one of four possible positions.

Figure 1:
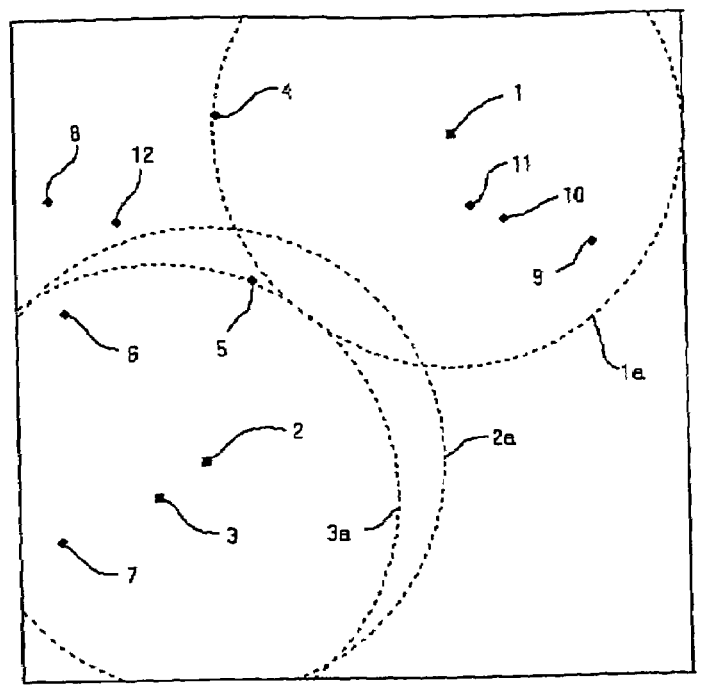
FIG. 1 is a diagrammatic representation of a wireless ad-hoc network prior to commencement of a procedure for locating the positions of the devices within the network.
Figure 2:
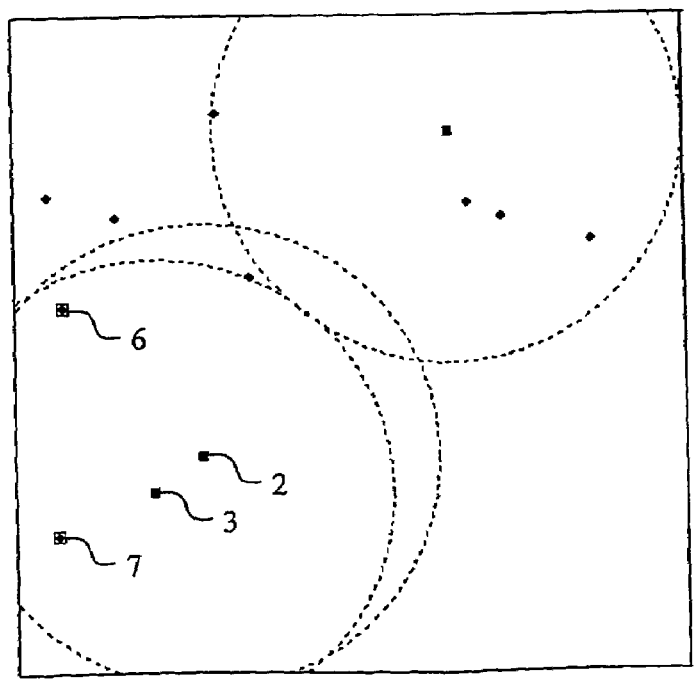
FIG. 2 is a diagrammatic representation of the wireless network of FIG. 1 after a first iteration of the position determination procedure.

Thus, FIG. 1 illustrates the wireless ad-hoc network of twelve position determining devices 1–12 prior to any iterations of the procedure for determining the locations of the devices. The behaviour of the network has been simulated and FIGS. 2 to 7 illustrate the evolution of the network during successive iterations of the position determination procedure according to the simulation. Each device 1–12 can also be thought of as forming a node of the network as a whole. Therefore the term node may be used in place of the term device throughout this document, when referring to the devices' role as nodes.

In the initial state of the network illustrated in FIG. 1, only three of the devices 1, 2, and 3 have a priori knowledge of their position. In the present embodiment, these three devices 1, 2 and 3 have such knowledge because they each have an inbuilt GPS. For purposes of illustration, the range 1a, 2a, 3a, of each of these devices 1, 2, 3 is shown in each of FIGS. 1 to 7. The ranges of the other devices 4–12 is omitted for the sake of clarity. However, the ranges of all of the devices (including those with and without in-built GPS's) are equal.

As will be apparent to a person skilled in the art, the communications between the devices can be carried out in a number of well known manners. The details of such methods of communication will not be described here in detail. 'Ad Hoc networking', Charles E. Perkins, Pub. Adison Wesley, December 2001 and the references cited therein provide a detailed description of some suitable such methods. Similarly, there are many well known methods of determining the distance from one device to another, such as, for example, the Radio Acoustic Ranging (RAR) method. Implementations of this method are well known and will not be discussed here in detail. Chapter 6 of 'Hydrographic Manual' by Commander K. T. Adams, Special publication of US dept. of commerce, Coast and geodetic survey published by US Govt. printing office, 1942 and the references cited therein provide a detailed description of RAR.

First Iteration

Step 1: the first step of the procedure is for the GPS containing devices 1, 2 and 3 to broadcast their (initially known) positions to all of the devices in range. Thus device 1 broadcasts its position to devices 4 and 9-11. Device 2 broadcasts its position to devices 5, 6 and 7 (and also to device 3 which, in the present embodiment, ignores this information for the purposes of position determination since it is able to identify its position via its in-built GPS). Finally, device 3 broadcasts its position to devices 6 and 7 (and also device 2, see comment above).

Step 2: the second step is for each device to determine its distance from each neighbouring device which is within range. Note that in the present embodiment, each device only attempts to determine its distance from devices with which it can communicate directly. In alternative embodiments, however, if the range determining mechanism can act over a greater distance than the communication device (as in the present embodiment, see the discussion below with reference to FIG. 7) it may be advantageous to permit devices having difficulty locating themselves using only their in-range neighbours to obtain distance information with respect to more remote, out of range devices and to obtain the position information from those out of range devices via intermediate nodes which are in range.

In the present embodiment, the devices 1, 2, 3 having in-built GPS's do not gather this information since they do not need to determine their positions. Device 4 determines its distance from nodes 1, 5, 8 and 12; Device 5 determines its distance from nodes 11,4,12,8,6 and 2; etc. (note for a fuller listing of the positions of the nodes, the nodes within range of one another and the details of the calculations performed by the nodes at each iteration of the method, see the Appendix, which sets out all of the details in note form).

Step 3: in the third step each device determines if it has sufficient information to determine either its position or a series of possible positions. In the present embodiment, this requires knowledge of the position, or series of possible positions, of two or more neighbouring devices. In the present example at the first iteration, this is the case only for nodes 6 and 7 (node 5 being just outside the range of node 3) which are in range of both nodes 2 and 3 which (since they include GPS's) have an initial knowledge of their position.

If a device determines that it has sufficient information to calculate its position or a series of possible positions it does so (in embodiments involving a very large number of devices it is possible that very large numbers of possible positions might have to be calculated and stored; such embodiments may therefore include a threshold such that if the series of possible positions includes more than a predetermined number of such possible positions then the possible positions are neither stored nor transmitted at the following step 1, in the hope that after subsequent iterations the number of possible positions will have reduced to below the threshold amount).

In the present embodiment, this is achieved by solving the following equations:

$$(X-X_{N1})^2+(Y-Y_{N1})^2=R_{N1}^2$$

$$(X-X_{N2})^2+(Y-Y_{N2})^2=R_{N2}^2$$

where $X_{N1}$ & $Y_{N1}$ and $X_{N2}$ & $Y_{N2}$ are the broadcast X and Y coordinates of a pair of neighbouring nodes N1 and N2 which have broadcast their X and Y coordinates during the preceding Step 1. The solution of these simultaneous equations will result in two possible positions of the node in question, a correct and an incorrect solution (though these may in theory coincide when the device in question and the neighbouring nodes all lie on a straight line). The incorrect solution is symmetrical with the correct solution along a line of symmetry connecting the two neighbouring nodes. Note that if information as to the position and distance from the node in question of a third neighbouring node were known, it would be possible to eliminate the incorrect solution. As will be appreciated from the specific descriptions of the calculations performed by devices in the present example given below, this combination of determining possible positions and comparing these possible positions with known ranges from third devices (in combination with their possible positions) it is possible to maintain and update lists of possible positions of each node.

Thus in the present example, node 6 determines that it should solve the following equations:

$$(X-118)^2+(Y-285)^2=129^2 \text{ (Node 2)}$$

$$(X-88)^2+(Y-308)^2=132^2 \text{ (Node 3)}$$

From which it determines that either X=32, Y=189 (which is the correct solution) or X=188, Y=393 (which is the incorrect solution).

At this first iteration there is no third neighbouring node from which node 6 can attempt to eliminate one of these two possible solutions. Thus it maintains both of these and proceeds to the next step. Node 7 performs a similar set of calculations to determine that either $X_{N7}$=28, $Y_{N7}$=336 or $X_{N7}$=45, $Y_{N7}$=359.

The third step represents the final step of the first iteration.

Second Iteration

First step: Every device which has information about its position or a series of possible positions broadcasts this information to all neighbouring devices in range. Thus nodes 1, 2 and 3 broadcast to the same nodes as in the first iteration (note if they have moved, the new positions of these nodes will be used by the neighbouring nodes 6 and 7 to update their series of possible positions based on the positions and distances of these nodes), including node 2 broadcasting to node 5. Additionally, node 6 broadcasts its pair of possible positions to nodes 5, 8 and 12 (as well as nodes 2 and 3 which ignore the information since they have in-built GPS's and node 7 which cannot use this information to eliminate impossible positions because node 6's information derives from the same nodes—nodes 2 and 3—as for node 7, thus preventing any possibilities from being ruled out). Node 7 is only in range of nodes 2, 3 and 6. It does broadcast to all of these nodes but it does not assist any of them to determine their location more accurately. The fact that nodes 6 and 7 have determined and are broadcasting a series of possible positions is indicated on FIG. 2 by replacing the diamonds representing nodes which have no positional information with squares surrounding crosses.

Second step: All of the devices re-measure their distance from neighbouring nodes as before. In the simulation of the present example, the devices do not move and so this step will be identical in all respects in each iteration and will not therefore be further described in subsequent iterations.

Third step: Devices 6 and 7 will recalculate their possible positions in the same way as in the second step in the first iteration with exactly the same results (since the devices are held stationary in the present example as simulated). However, device 5 now has sufficient information to attempt to calculate a series of possible positions based on the position information received from nodes 6 and 2. It derives four possible positions in total, two from assuming node 6 is in one of its possible positions and two from assuming node 6 is in the other of its possible positions (see the Appendix for the exact values calculated by node 5).

Third Iteration

Figure 3:
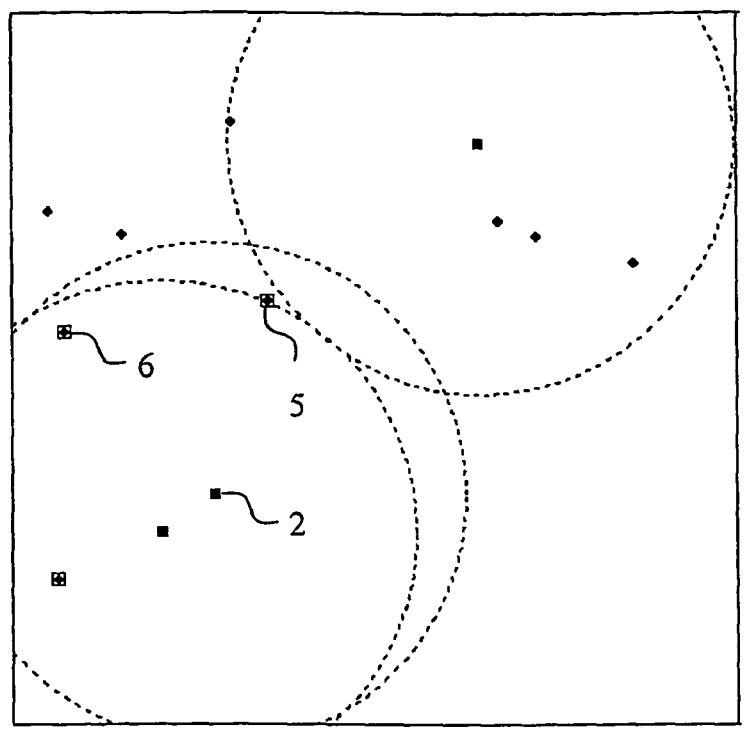
FIG. 3 is a diagrammatic representation of the wireless network of FIG. 1 after a second iteration of the position determination procedure.

First step: The devices re-broadcast their position information if known. The only difference from the preceding iteration here is that node 5 has a series of four possible positions which it broadcasts to nodes 2, 4, 6, 8, 11 and 12. This is illustrated in FIG. 3 by having changed the symbol used to indicate node 5. Nodes 2 and 6 effectively ignore this information as it cannot assist them in improving their positional information. However, the broadcast information from node 5 to nodes 4, 8, 11 and 12 means that each of these nodes is now in range of two nodes which have broadcast to them positional information (broadcasting nodes 1 and 5 are in range of nodes 4 and 11; broadcasting nodes 5 and 6 are in range of nodes 8 and 12).

Second step: As before, each device determines its distance from each in-range neighbour.

Third step: The non-GPS nodes which already have some positional information (ie nodes 5, 6 and 7) recalculate their possible positions. In the present example this leads to the same results as in the previous iteration because they have no new information and all of the nodes are static. The non-GPS nodes which received sufficient information to calculate their possible positions for the first time in the first step of this iteration (ie nodes 4, 11, 8 and 12) calculate their possible positions for the first time. Nodes 4 and 11 obtain eight possible positions (see Appendix 1 for details), two for each possible position of node 5 (note that node 1 is a GPS node and thus has only 1 possible position). However, four of the possible positions of node 4 calculated in this way are complex. This corresponds to two of the possible positions of node 5 being unfeasibly faraway from node 1 given the known distance of node 4 from both node 1 and node 5 (the circles surrounding the possible positions of nodes 1 and 5 having radius corresponding to the determined distance between node 4 and nodes 1 and 5 respectively do not intersect for these two unfeasible possible positions of node 5). Similarly, six of the possible positions of node 11 calculated in this way are complex (corresponding to three of the possible positions of node 5 being unfeasible), leaving node 11 with only two possible positions (note this effectively narrows down the number of possible positions of node 5 to 1 position—node 5 will be able to determine this itself as soon as it receives the possible positions of node 11 at step 1 of the following iteration).

Nodes 8 and 12 obtain sixteen possible positions, two for each of the eight possible combinations of the four possible positions of node 5 and the two possible positions of node 6. However, in both cases half of these combinations of possible positions of nodes 5 and 6 give rise to complex solutions and hence correspond to unfeasible combinations, reducing the number of possible positions of nodes 8 and 12 to eight each (see the Appendix for details).

Fourth Iteration

Figure 4:
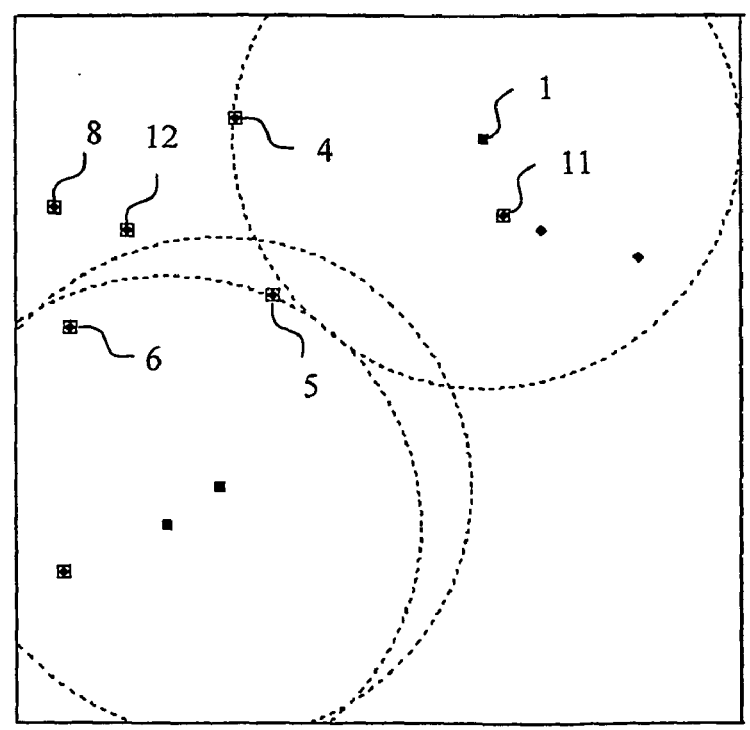
FIG. 4 is a diagrammatic representation of the wireless network of FIG. 1 after a third iteration of the position determination procedure.
Figure 5:
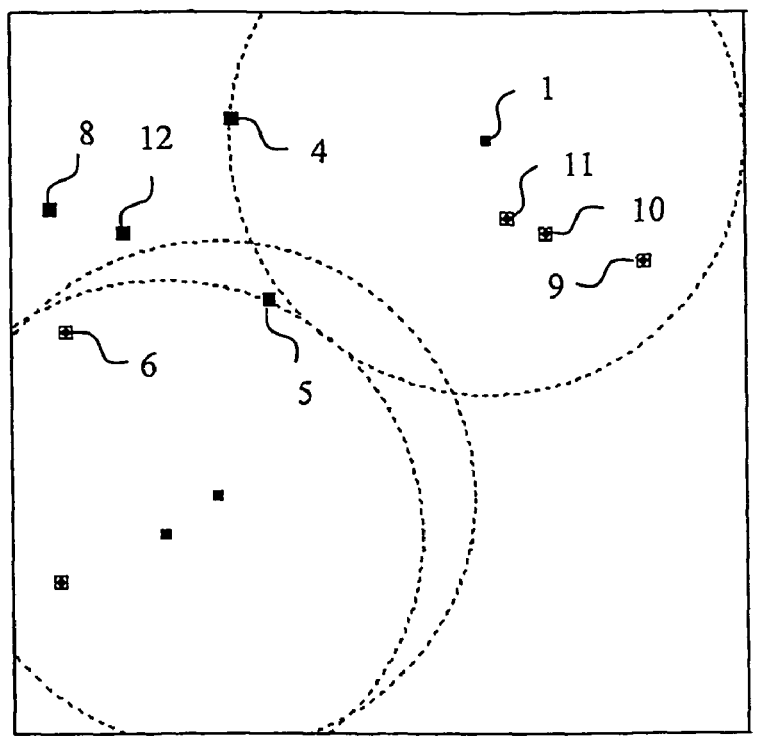
FIG. 5 is a diagrammatic representation of the wireless network of FIG. 1 after a fourth iteration of the position determination procedure.
Figure 6:
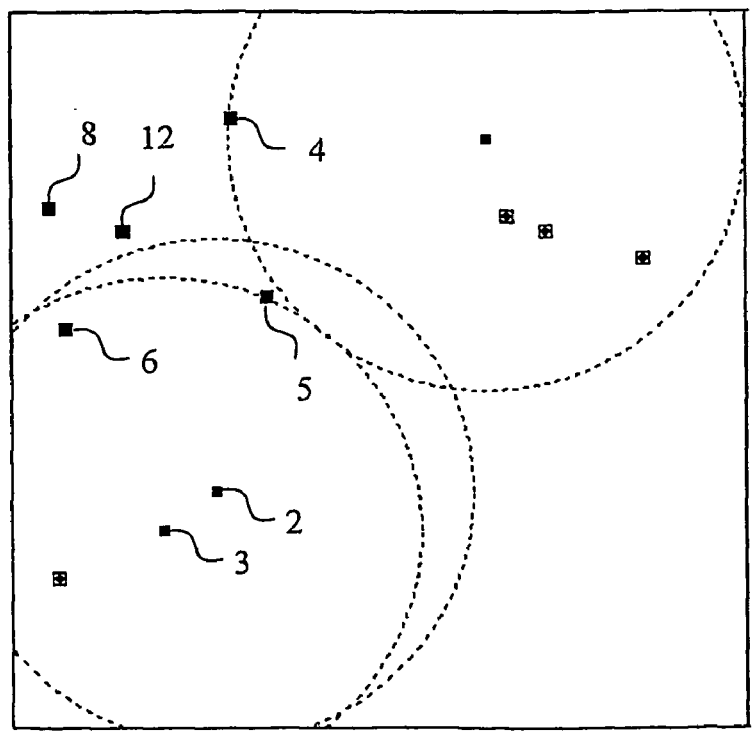
FIG. 6 is a diagrammatic representation of the wireless network of FIG. 1 after a fifth iteration of the position determination procedure.

Step 1: In this iteration, all of nodes 1, 2, 3, 4, 5, 6, 7, 8, 11 and 12 now have ome information about their position (ie one ore more possible positions) which they broadcast to all of their neighbours in range. This is illustrated in FIG. 4 in which all of nodes 4, 5, 6, 7, 8, 11 and 12 are represented by the square surrounding a cross marking which indicates that these devices are all broadcasting a series of possible positions. This means that nodes 9 and 10 receive broadcasts from nodes 1 and 11 so that these two devices will be able to determine a series of possible positions for the first time in step 3. Additionally, nodes 4, 5, 8 and 12 receive broadcasts from sufficiently many other nodes that they are able to eliminate all but the correct solutions from amongst the possible locations derived from just two of the total number of nodes used to determine a series of possible positions.

Step 2: As before, each device determines its distance from each in-range neighbour.

Step 3: Devices 9 and 10 calculate at this step for the first time a series of four possible positions each using the positional information broadcast by both of nodes 1 and 11. The four possible positions derive from two possibilities in respect of each of the two broadcast possible positions of node 11.

Device 5 receives the two possible positions of node 11 for the first time and uses this information to eliminate all but the correct position from its series of four possible positions determined (as in the previous iteration) from the information received from nodes 2 and 6, to thus arrive at its actual position.

Device 4 receives all of the possible positions of nodes 8 and 12 and uses these to eliminate all but the correct position from its series of four possible positions determined from the information received from nodes 1 and 5.

Device 8 receives all of the possible positions of nodes 4, 5, 6 and 12. In this case, device 8 arbitrarily decides to obtain a series of sixteen possible locations (only six of which are real) using the possible positions of nodes 4 and 6 and then to use the possible positions of nodes 5 and 12 to eliminate all but the correct position from the (real) six possible locations.

Device 12 receives all of the possible positions of nodes 4, 5, 6 and 8. In this case, device 12 arbitrarily decides to use nodes 4 and 6 to derive a series of sixteen possible positions of which twelve are eliminated straight away as they give complex positions and the remaining three are eliminated as incompatible with any of the possible positions of either of nodes 5 or 8 as broadcast to device 12 during step 1 of this iteration.

Fifth Iteration

Step 1: At this point, all of the devices have some positional information and thus all of the devices broadcast this positional information to all of the devices in range. Furthermore, devices 4, 5, 8 and 12 have identified their actual position (as opposed to a series of possible positions) and these nodes are therefore indicated in FIG. 5 by large solid squares.

Step 2: As before, each device determines its distance from each in-range neighbour.

Step 3: As is evident from FIG. 5, node 6 is now in range of at least three neighbouring nodes which have identified their position (nodes 2, 3, 5, 8 and 12). This enables device 6 to determine its own position uniquely. In this case it does this by again obtaining a pair of possible positions from the information received from nodes 2 and 3 and then eliminating the incorrect solution by comparing the distance to any of the other nodes whose position is known (ie any of nodes 5, 8 or 12) as calculated using the pair of possible positions for device 6 just calculated, with the actual distance to the node as determined in step 2.

Sixth Iteration

Step 1: As before, all of the nodes broadcast their position information to every node in range. The only difference from the corresponding step 1 in the preceding iteration is that in this iteration device 6 has now identified its actual position. This information is broadcast to node 7 (in addition to the other nodes which are in range of node 6).

Step 2: As before, each device determines its distance from each in-range neighbour.

Figure 7:
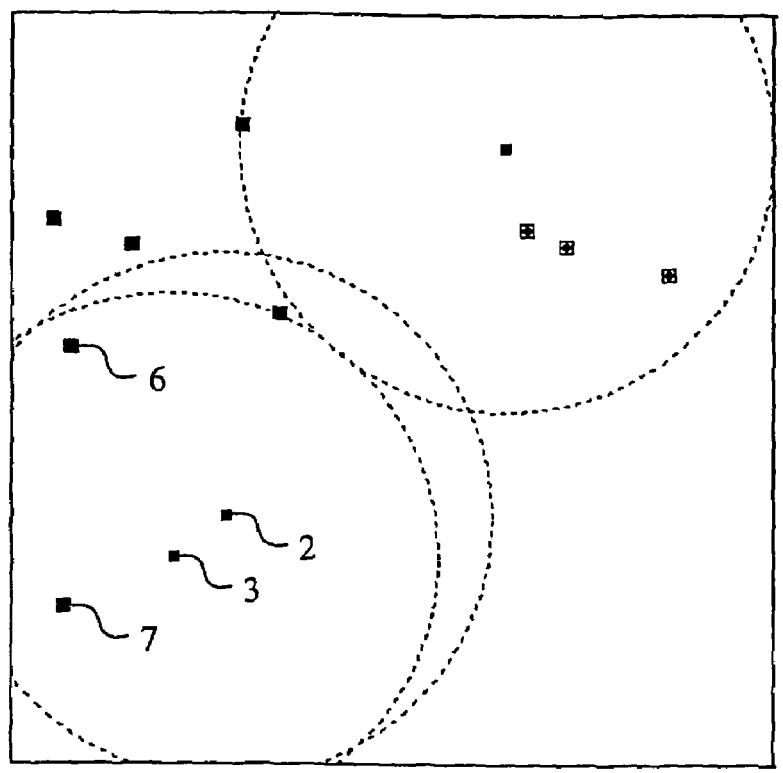
FIG. 7 is a diagrammatic representation of the wireless network of FIG. 1 after a sixth iteration of the position determination procedure.

Step 3: Node 7 now has three nodes in range which have all broadcast a single position to node 7 which can therefore determine its own position uniquely (ie removing the ambiguity in the position of node 6 enables node 7 to remove the ambiguity from its own position). The other devices perform the same calculations as before to reconfirm their own positions (or series of possible positions in the case of nodes 11, 10 and 9). Note that in the present example where there is no movement of the nodes, the situation is now static and no further nodes will be able to improve their knowledge of their position in subsequent iterations. This position is illustrated in FIG. 7 in which nodes 9, 10 and 11 are indicated as broadcasting a series of possible positions at each iteration after the sixth (by use of the square symbol surrounding a cross) whilst all of the remaining non-GPS nodes are indicated as broadcasting their actual position at each subsequent iteration (by use of a larger solid square).

Description of an Individual Device

Figure 8:
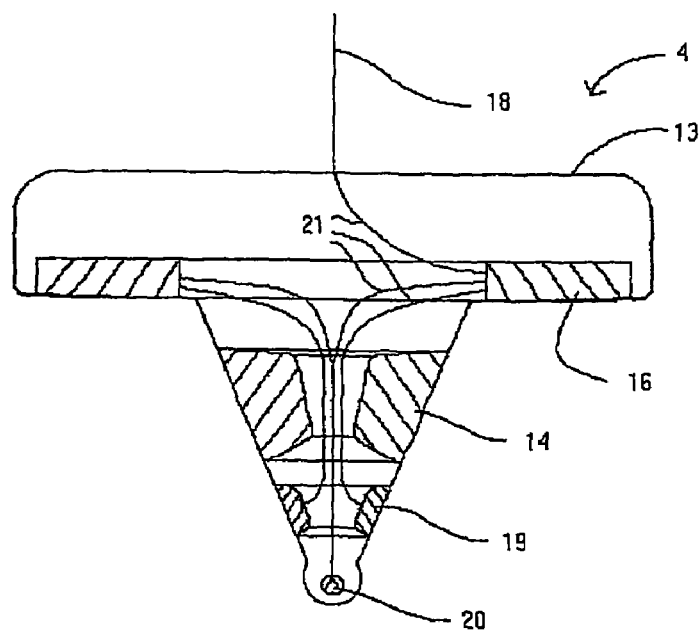
FIG. 8 is a schematic diagram of an individual device of the wireless network of FIG. 1.

FIG. 8 illustrates an individual one, 4, of the non-GPS devices 4-12 in greater detail (note that in the present embodiment, all of the non-GPS devices are identical to one another, while the GPS devices 1-3 are similar except that they include a GPS device). In alternative embodiments however it may be advantageous to provide the more expensive GPS devices with other additional features over and above the standard non-GPS devices, which features are required in only a minority of the devices.

As shown in FIG. 8, the device 4, comprises a water-proof casing 13 having the shape of an inverted cone with a large disk-shaped base. Within the cone-part of the casing 13 there is an annular ballast 14 which ensures that, in use, the device floats with the cone-part submerged beneath the surface of the water while the base part floats above the surface of the water. Mounted within the base part is an annular control and power source part 16; this contains a battery as a source of power and various electronic modules, for controlling the transmission and reception of various signals from and to the device 4, described in greater detail below. Mounted at the centre of the top surface of the base-part of the casing 13 is an aerial 18; this choice of location ensures that the aerial 18 is generally above the surface of the water on which the device is floating when in use. The device 4 also includes a sensor part 19 which includes a sonar receiver and, in the present embodiment, a temperature sensor, located towards the point of the cone-part to ensure that it is always located beneath the surface of the water. Located in the point of the cone part is a sonar transmitter 20 for radiating sonic waves. The aerial 18, sensor part 19 and sonar transmitter 20 are all connected to the control and power source part 16 via suitable connecting wires 21.

As mentioned above, the devices determine their range from one another using the Radio Acoustic Ranging (RAR) method referred to above. This method essentially involves a device transmitting a radio wave via aerial 18 and a sound wave via the sonar transmitter simultaneously. The neighbouring devices which are in range detect the incoming radio signal and then measure the time elapsed before they receive the sound wave signal. A simple velocity over time calculation then gives rise to the distance between the transmitting and receiving devices.

As will be apparent to a person skilled in the art, the control and power source part 16 includes circuitry for transmitting and receiving signal over the air interface between neighbouring devices via their aerials 18, control circuitry for activating the sonar transmitter 20 and processing circuitry for processing signals received from the sensor part 19 to detect when a sound wave is received and also the temperature of the water adjacent to the sensor part 19. The processing circuitry is also able to control the device to carry out the various steps of the positioning protocol described above, including the necessary digital processing, storage and timing means.

Variations

In embodiments where the devices move, knowledge of the maximum expected speed can advantageously be used to help eliminate unlikely possible solutions as devices come in and out of range of one another.

Instead of having aerials or other range finding devices which transmit and/or receive signals equally well in all directions, it would be possible to use non-symmetrical devices to reduce the ambiguity of the position of nodes. For example, in one embodiment, each node has two transmitters and receivers, each of which is able to transmit/receive signals from a sector of a circle such that the node is able to transmit/receive information from all directions except for a small portion at the front and back where transmission does not cover to prevent interference. Thus by knowing the range to other nodes, node orientation and which side of those nodes the node being located lies on, similar equations can be solved to determine position of a node. The advantage of this approach is that there is less ambiguity in the possible position of the node. However, there is a chance that nodes which are within range of one another will not be able to communicate due to the "black spot" at both the front and the back of each node.

Instead of relying solely on range information, the devices could include some means of determining a bearing from one or more nodes with which they are able to communicate (possibly indirectly through the network) or from completely independent objects at known positions (ie beacons). In such a case, each node will be able to locate itself with fewer neighbouring nodes. However, such bearing determination means are likely to increase the cost of individual devices.

An alternative application for these devices would be in monitoring active volcanoes. In such an application, a number of devices can be carefully placed in selected locations and programmed in with their locations (these would then replace the GPS devices of the above described embodiment). The remaining devices may then be randomly dispersed from say a helicopter or aeroplane flying over the mouth of the volcano. Although some devices will inevitably perish in the adverse conditions, it is probable that sufficient can survive to form an ad-hoc network and to report back to the outside (carefully located) devices which can then forward on useful information to a remote station where the data can be processed.

There are many possible applications for devices as above described such as, for example, employee identity cards which continually locate the wearer and update their position to a central computer, or traffic monitoring systems where such a device is located in a number of vehicles, and traffic jams can be detected and avoided, etc.

Part 1 of this description additionally includes the following clauses:

1. A method of obtaining positional information about individual wireless devices within a wireless ad-hoc network including a plurality of position determining devices in which each position determining device includes means for estimating the distance between itself and any other similar device forming part of the network which is within range, the method including the steps of:
   i) each position determining device receiving a broadcast message from each other similar device in range specifying, if known, the respective broadcasting device's position or series of possible positions;
   ii) each position determining device attempting to measure its distance from each other similar device in range;
   iii) each position determining device calculating, if it has sufficient information, its position, or a series of possible positions and storing this information; and
   iv) each position determining device broadcasting to each other similar device in range, if known, its position or series of possible positions determined in step iii.
2. A method according to clause 1 wherein the position determining devices employ one or both of sonar and radar techniques for determining their distance from neighbouring position determining device.
3. A method according to either preceding clause wherein the means for estimating the distance between itself and any other similar device of one or more of the position determining devices is non-rotationally symmetrical, whereby certain ambiguities in the possible positions of said one or more of the position determining devices can be resolved or avoided.
4. A method according to clause 3 wherein the or each distance estimating means comprises a first and second pair of a transmitter and a receiver, and wherein the first pair is able to transmit and receive signals only within a first sector of a circle centred around the respective device and approximately in the plane of the network of devices, and the second pair is able to transmit and receive signals only within a second sector of the circle, wherein the first and second sectors do not overlap one another.
5. A method according to any preceding clause including the step of informing a minority of the position determining devices of their position independently of the other devices in the network.
6. A method according to clause 5 wherein at least three devices are independently informed of their position.
7. A method according to clause 5 or 6, wherein at least two devices which are in range of a third device are independently informed of their position.
8. A method according to clause 5, 6 or 7 wherein no more than twenty five percent of the devices are independently informed of their position.
9. A method of operating a wireless device for use in forming, together with a plurality of other similar devices, a wireless ad-hoc network, the method comprising the steps of:
   i) listening for a broadcast message from each other similar device in range specifying the respective broadcasting device's position or series of possible positions;
   ii) attempting to measure its distance from each other similar device in range;
   iii) calculating, if it has sufficient information, its position, or a series of possible positions and storing this information; and
   iv) broadcasting to each other similar device in range, if known, its position or series of possible positions determined in step iii.
10. A carrier medium carrying processor implementable instructions for causing a device or devices to carry out the method of any preceding clause during implementation of the instructions.
11. A device for use in forming, together with a plurality of other similar devices, a wireless ad-hoc network, the device comprising:
    i) a receiver (18, 21, 16) for receiving a broadcast message from each other similar device in range specifying, when known, the respective broadcasting device's position or series of possible positions;
    ii) distance measurement means (16, 21, 18, 19, 20) for measuring the device's distance from each other similar device in range;
    iii) processing means (16) for calculating, if it has sufficient information, its position, or a series of possible positions and storage means (16) for storing this information; and
    iv) a transmitter (16, 21, 18) for broadcasting to each other similar device in range, if known, its position or series of possible positions determined by the processing means and stored in the storage means.

Part 2: FIGS. 9 to 17

Figure 9:
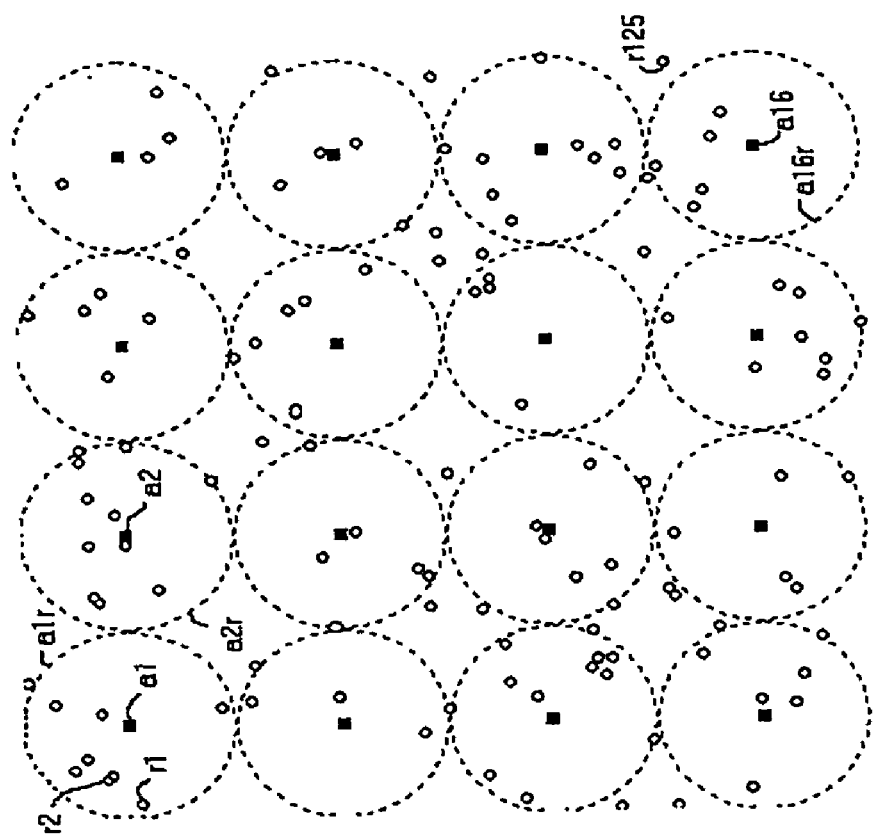
FIG. 9 is a schematic diagram of an arrangement of position determining devices some of which have a priori knowledge of their position and the others of which perform an iterative algorithm to find estimations of their positions.

Referring firstly to FIG. 9, one aspect of the present invention is an algorithm or procedure by which individual devices forming nodes within an ad hoc network can attempt to estimate their position based on the information broadcast to them by their neighbouring nodes together with a measured value of their distance from those neighbouring nodes. A first example of such a procedure, described below, is particularly advantageous because it is robust to noise within the measurements of distance between nodes and because it is effective even in ad hoc networks in which a small number of nodes having a priori knowledge of their position (henceforth referred to as "a priori" nodes) are so thinly distributed that no two such nodes are sufficiently close to one another for both nodes to be able to communicate (simultaneously) with a third node (not having a priori knowledge of its position).

In order to demonstrate the robustness of the example procedure in an ad hoc network with a sparse density of "a priori" nodes and some noise on the distance measurements, the operation of the example procedure in an ad hoc network having the arrangement shown in FIG. 9 is described below (note the actual performance of the procedure was carried out on a computer simulation). The particular arrangement of FIG. 9 was formed by providing a grid of sixteen "a priori" nodes a1,a2, . . . ,a16 evenly spaced apart from one another such that their ranges of communication a1*r*, a2*r*, . . . , a16*r* just touch one another without any overlap, as shown. On to this grid area (a square having sides equal to four times the diameter of each range of communication circle a1*r*–a16*r*), 125 nodes r1,r2, . . . ,r125 which do not have any "a priori" knowledge of their position are randomly distributed (for this reason they are henceforth referred to as random nodes as distinct from the "a priori" nodes which are placed in non-random specified positions).

Figure 10:
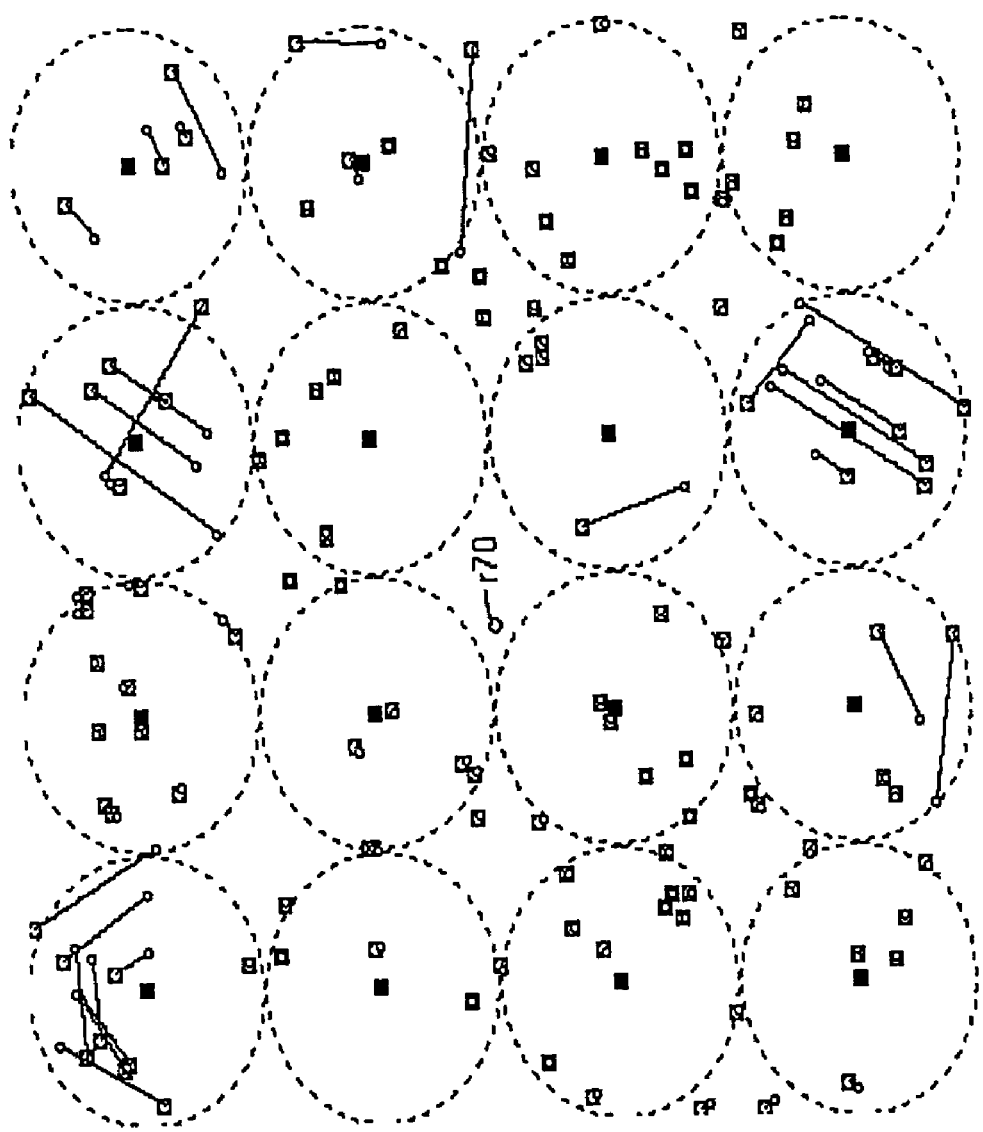
FIG. 10 is a schematic diagram of the arrangement of FIG. 9 illustrating the estimated positions of each of the nodes not having a priori knowledge of their position after approximately 1300 iterations of a position estimation procedure according to the present invention.

The position estimation procedure is then carried out until a reasonably stable solution is arrived at. This may be determined on a node by node basis by simply freezing the node's individual position estimation if it has not changed significantly for a predetermined large number of iterations. However in the present simulation, the procedure was simply allowed to continue until no further significant improvement was being achieved in the overall percentage of nodes successfully locating themselves within 5% of their correct position. This occurred after approximately 1300 iterations of the procedure. The situation after these 1300 iterations is illustrated in FIG. 10 in which the actual position of each random node which has managed to form an estimation of its position (124 out of the 125 random nodes) is marked with a hollow square and the estimated position of each node is indicated by a hollow circle (which, if it is located outside the corresponding hollow square, is connected to its respective hollow square by a straight line). The single random node r70 which was not able to locate itself is located towards the centre of the grid and was unable to locate itself at all because it was not in range of any other node (note that the random nodes have exactly the same range of communication as the "a priori" nodes though these are not marked in either FIG. 9 or 10 to avoid rendering the Figures unclear due to excessive clutter).

Note that in the description of the procedure below, details of how and when the positional information from neighbouring nodes is received, the details of how and when the current estimate is broadcast to other nodes and details of how and when the distance to neighbouring devices is measured are deliberately not discussed. This is because these procedures are considered to operate at a different modular "layer". Operating in this way is advantageous because the details of how these lower level procedures are performed should not be of concern to the procedure described below. Instead, an interface is provided whereby the procedure is able to access the latest positional information which has been broadcast to the device, the latest measured distances and it makes available at all times the current estimated position, from and to the lower layer respectively, which is then responsible for communicating with its neighbouring devices in a conventional manner. All that is required is that the communications should happen at the same frequency with which iterations are performed. Preferably, the communications with neighbouring nodes and the measurement of distances to neighbouring nodes occurs when the procedure described below is waiting between execution of consecutive iterations. However, if the network is static, it is not necessary to continually update the distance measurements since these will not change.

Figure 11A:
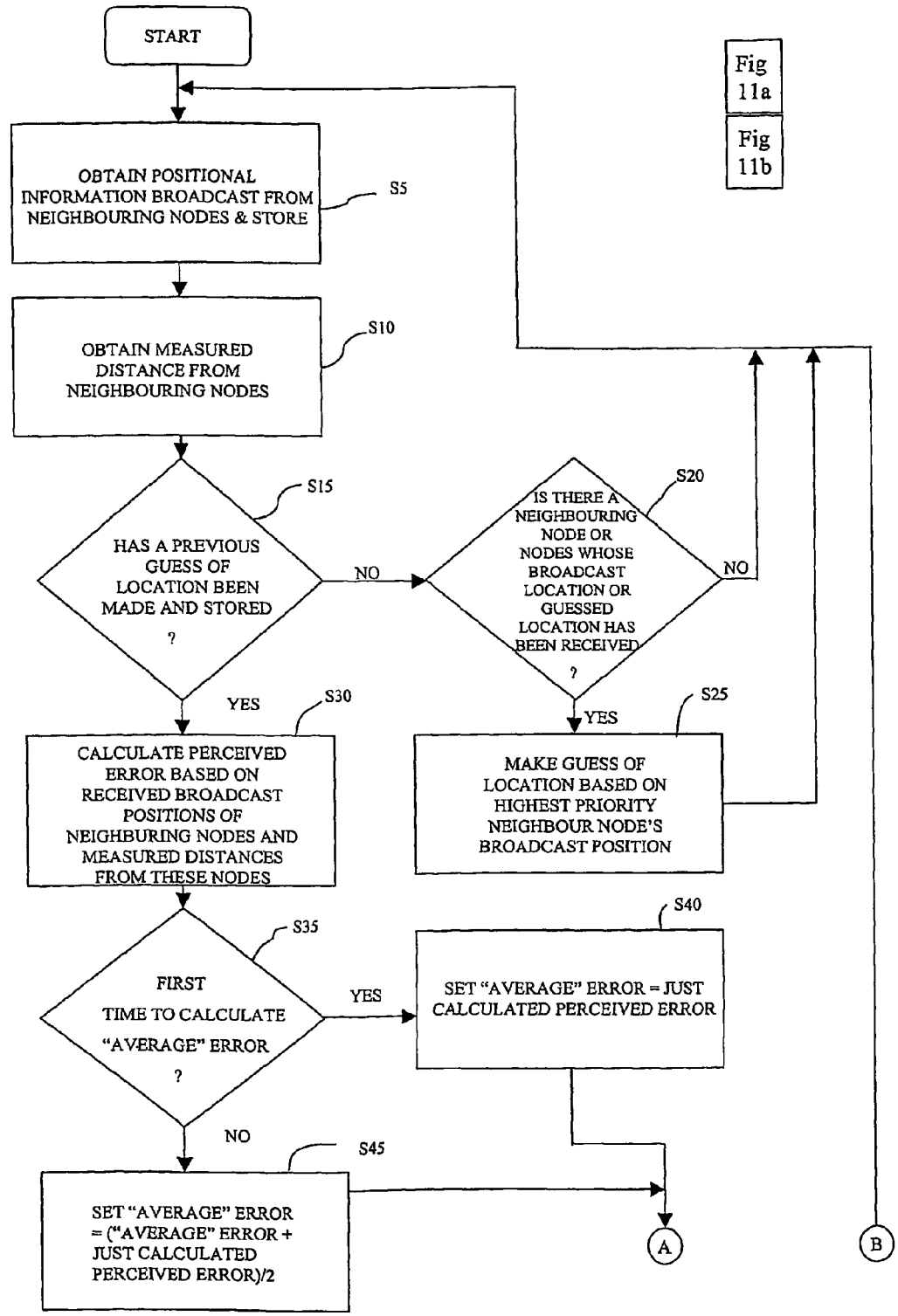
FIGS. 11a and 11b is a flow chart of the iterative procedure performed by the devices illustrated in FIGS. 9 and 10 not having a priori knowledge of their position.
Figure 11B:
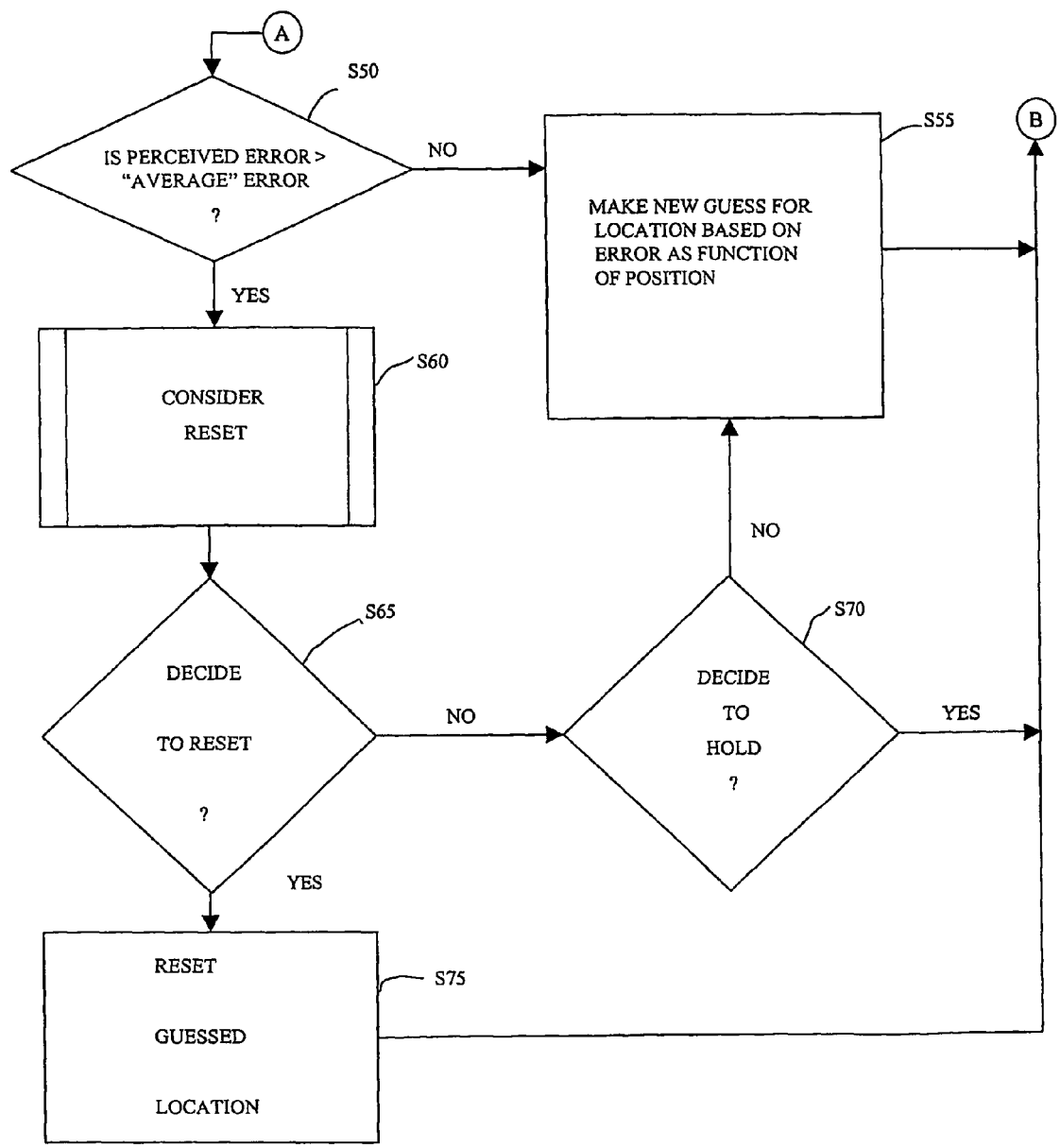

Referring now to FIG. 11, the procedure followed by each random node is described below. Note that the "a priori" nodes need only broadcast their (assumed to be completely accurate) positions at the beginning of each iteration. Prior to commencing the procedure, each device will have a few variables etc. initialised including initialising an estimate-made flag, indicating whether or not a first estimate at the device's position has yet been made, to an unset state, initialising a first-average-calculate flag, which indicates whether the first "average" error has still to be calculated, to a set state and initialising the number of iterations of the procedure to zero and a No-of-guesses variable (whose purpose becomes clear from the following description) to zero. With these initialisations made, the procedure can commence with flow passing from the start of the flow chart to step S5 in which the device gets and stores positional information (if any is available) received from neighbouring nodes which are within communication range of the specified device. Note that to render the description of the procedure as clear as possible, the procedure will henceforth be described from the point of view of a single device hereinafter referred to, where necessary for the sake of clarity, as the present device.

The positional information is broadcast between the nodes using a limited range radio communication, the precise details of which are not relevant to the present invention and will not therefore be discussed here in detail. As will be apparent to a person skilled in the art, the communications between the devices can be carried out in a number of well known manners. 'Ad Hoc networking', Charles E. Perkins, Pub. Adison Wesley, December 2001 and the references cited therein provide a detailed description of some suitable such methods.

Upon completion of step S5, flow passes to step S10 in which the present device gets and stores distance information (ie the measured distance between the present device and each neighbouring node within communication range).

As with methods of broadcasting information between nodes, there are many well known methods of determining the distance from one device to another which are suitable for use within an ad hoc network. For example, the Radio Acoustic Ranging (RAR) method or a similar method based on detecting the difference in time taken for a sound wave versus a radio wave to travel the distance to be measured (or a known multiple thereof). would be appropriate. Implementations of these method are well known and will not be discussed here in detail since they are not germane to the present invention. Chapter 6 of 'Hydrographic Manual' by Commander K. T. Adams, Special publication of US dept. of commerce, Coast and geodetic survey published by US Govt. printing office, 1942 and the references cited therein provide a detailed description of RAR.

Upon completion of step S10, flow passes to step S15 in which it is determined whether or not a previous estimate of the present device's position has been made during an earlier iteration of the procedure. In the present embodiment, this is determined by seeing if the estimate-made flag is unset or set. If the flag is still unset, flow passes to step S20 where it is determined if the device has sufficient information to make a first estimate of its position.

To do this, in the present embodiment, it needs to know the actual or estimated position of, and measured distance to, at least one neighbouring node (henceforth the term "neighbouring node" will be used to refer to a node which is within communication range). If this information is known an estimate of the device's position will be made based on the information. If it has this information in respect of more than one neighbouring node, it will base its estimate on the information of the highest priority node (with "a priori" nodes having highest priority or otherwise the closest random node).

As an example, on the first iteration, node r1 (together with all of the other nodes within range of the "a priori" node a1) will receive the necessary information only from "a priori" node a1, since none of its other neighbours (eg node r2) will yet have had a chance to estimate their position. Thus node r1 will estimate its position as being anywhere on the circle whose centre is given by the broadcast position of the "a priori" node a1, and whose radius is equal to the measured distance (as measured by device r1) between device r1 and "a priori" node a1. To specify a particular position, the device chooses a random number between 0 and 2π and uses this to set an angle with the direction along the x-axis in the positive direction corresponding to zero (radians), for example. By contrast, random node r9 is not within range of any "a priori" nodes and thus on the first iteration will not have any information on which to estimate its location. However, by the second iteration its random node neighbours (r5, r7 and r8) will all have formed an estimate of their position (based on node a1) and will have broadcast this to node r9. Since random node r8 is the closest of these three, the estimated position from this node, and the measured distance therefrom, is used to form an estimate of the position of node r9 (again by choosing a random angle between 0 and 2π radians and using this to select a position on the circle centred on the estimated broadcast position of node r8 and having radius equal to the measured distance— as determined by node r9—between nodes r9 and r8).

If at step S20 it is determined that there is insufficient information to form an estimate of its location, the iteration is ended and flow is returned back to step S5 where the variable storing the number of iterations of the procedure is incremented and a predetermined time is allowed to elapse before performing a further iteration. Note that whenever an iteration comes to an end and the flow is passed back to step S5 to await the commencement of a new iteration, the variable storing the number of iterations of the procedure is incremented and a predetermined time is allowed to elapse before performing the next iteration.

If at step S20 it is determined that there is sufficient information available to make a first estimate, then flow is passed to step S25 where a first estimate is made in the manner described above (ie using the highest priority neighbouring node's broadcast position and the measured distance to the neighbouring node and randomly choosing a point on the appropriate circle), and the estimate-made flag is set. Then the current iteration is ended and flow is returned to step S5.

If at step S15 it is determined that the estimate-made flag is set, then the flow is passed to step S30, in which the perceived error, E, for the estimated position determined by the present device in the previous iteration is calculated. This error is calculated on the basis of the most recently broadcast positions of the present device's neighbouring nodes and the measured distances from the present device to each neighbouring node using, in the present example, the following equation:

$$E = \sum_{All\_Neighbouring\_Nodes} (md - hd)^2$$

where md is the measured distance between the present device and a given neighbouring node, and hd is the hypothetical distance between the present device and the given node.

Upon completion of step S30, flow passes to step S35 in which it is determined whether or not an "Average" Error has yet been calculated. In the present embodiment, this is done by examining the first-average-calculate flag to see if it is set or unset. If the flag is set (indicating that the first calculation of an "Average" Error is yet to be performed), then flow is passed to step S40.

In step S40, the "Average" Error is set to equal the value calculated for the perceived Error, E, calculated in step S30, the first-average-calculate flag is unset and flow is passed to step S50.

If in step S35 it is determined that an "Average" Error has previously been calculated then flow is passed to Step S45 where the "Average" Error is up-dated. This is done using the formula "Average" Error=("Average" Error+perceived error E)/2.

Upon completion of step S45, flow is passed to step S50 in which it is determined if the newly calculated perceived error, E, is greater than the newly calculated "Average" Error. If it is not, it is deemed to be indicative of a general trend towards an improved estimated position and flow is passed to step S55.

In step S55, a new estimated position is calculated which has a reduced perceived error. In the present embodiment, this is done in the following manner:

Firstly, the gradient of the perceived error is calculated (ie $\underline{\nabla}E$ is calculated) at the current estimated position of the present device to determine the direction in which the perceived error falls most quickly. A first trial position is then selected along the line extending from the current estimated position of the present device, the distance from the current estimated position of the trial position being given according to a predetermined formula which in the present embodiment is given by:

TRIAL_POS=Const.$|\underline{\nabla}E|$

Where Const is a predetermined constant which is set in dependence upon the particular geometry of the ad hoc network arrangement and in the present example is set to a value of sixteen distance units. Each node now has stored 2 values of E at either end of the line of Del(E). An iterative procedure is then followed which comprises the following steps: pick another point on the line of Del(E) halfway between the previous points and calculate the perceived error, E, at that point; discard the highest value error point (one end) and repeat. In the present example, this iterative procedure is followed for a total of 10 times. The procedure is, in essence, a Newtonian approximation which is known to quickly home in on a minimum value in certain circumstances (where there are not lots of local minima). It is used in the present example because the error function, E, generally doesn't have a huge number of local minima along a line of Del(E). It is possible that the approximation will find a local minima along the line rather than the global minimum, but it is unlikely, and if it does the procedure still functions adequately. Also as part of this step, the No-of-guesses variable is incremented by one.

Upon completing step S55, the current iteration is ended and flow is passed back to step S5.

If at step S50 it is determined that the perceived error is greater than the "Average" Error, this is taken as a sign that the present device may be stuck in a local minimum of the perceived error, E, which is actually some distance removed from the actual position of the present device. As a result, flow is passed to subroutine S60 at which it is determined whether or not the present device should perform a reset, hold its current estimated position or generate a new estimated position in the normal way (ie via step S55). The steps performed within subroutine S60 are described in greater detail below with reference to FIG. 12.

Upon completion of subroutine S60, flow proceeds to step S65 in which it is determined whether subroutine S60 decided that a "reset" should occur. If it was not decided to reset, flow proceeds to step S70 in which it is determined whether subroutine S60 decided that a "hold" should occur. If it was determined that a "hold" should occur, then the iteration is ended and flow returns to step S5. If it is determined in step S60 that a hold should not occur, then flow proceeds to step S55 in which a new estimate is formed in the manner described above.

If at step S65 it is determined that a "reset" is to occur, flow proceeds to step S75. In step S75 a new estimate of the position of the present device is made according to the following procedure, in the present example: one of the neighbouring nodes is selected and the new estimate is set to be at a position the same distance from the selected node but on the opposite side (ie the new estimated position is a rotation about the selected neighbouring node of $\pi$ radians from the former estimated position). Additionally in this step, the No-of-guesses variable is reset to zero.

Upon completion of step S75, the current iteration is ended and flow returns to step S5.

Figure 12:
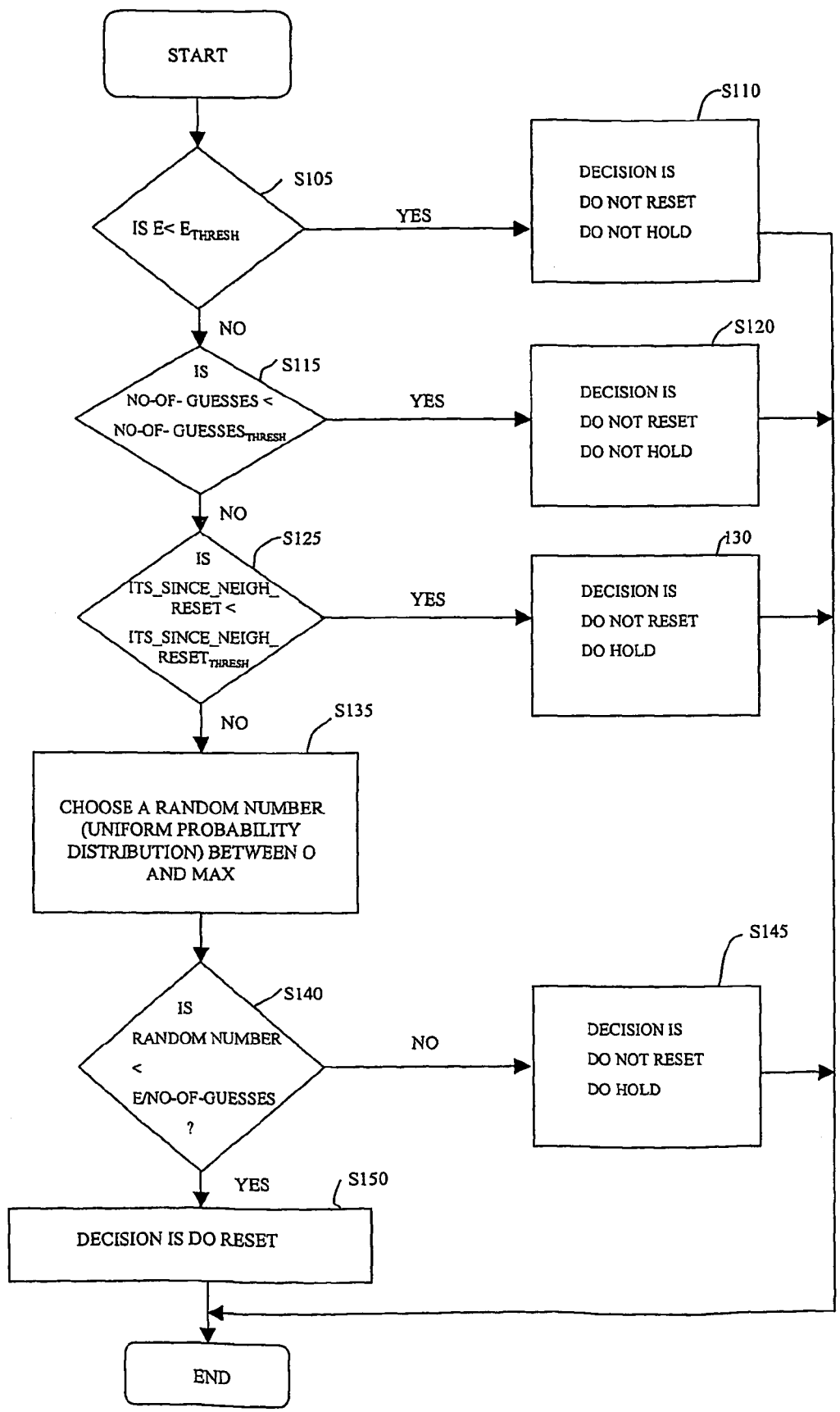
FIG. 12 is a flow chart illustrating the sub-steps of a "CONSIDER RESET" sub-routine of the procedure of FIG. 11.

Referring now to FIG. 12, at the commencement of the subroutine S60, flow passes to step S105 in which the current value of the perceived error, E, is compared with a predetermined threshold, $E_{THRESH}$, which, in the present example, is set to equal four times the number of neighbouring nodes to the present device. Note that optimally the threshold for perceived error is dependent on the level of expected noise (more noise, higher threshold). It has been found that for an approximate expected noise of 5%, a threshold of 1×(# of neighbouring nodes) works well whereas for 10% noise (which corresponds approximately to the amount of simulated noise used in the present example), a threshold of 4×(# neighbouring nodes) was found to work well. Note that 10% noise can be taken to mean that where the noise is approximately Gaussian, the vast majority of measured distances are within 10% of the actual distance which is trying to be measured. Note that it has been determined that the multiplication factor (1 in the case of 5% noise, 4 in the case of 10% noise) should optimally vary as the square of the expected percentage error in the system (i.e. doubling error raises the threshold by 4×).

If it is determined in step S105 that E is below the threshold $E_{THRESH}$, then flow proceeds to step S110 in which the resulting decision of the subroutine is set to indicate not to reset and not to hold and flow proceeds to the end of the subroutine.

The significance of this test is that if the perceived error is very low it is likely that the present device's current estimated position is in approximately the correct area and a reset would be likely to send the estimated position into the wrong area and therefore should be avoided.

If at step S105 it is determined that E is greater than $E_{THRESH}$, then flow passes to step S115.

At step S115 it is determined whether the value stored in the No-of-guesses variable, NO_OF_GUESSES, is below a threshold, $NO\_OF\_GUESSES_{THRESH}$, which, in the present example procedure is set to 20. If it is determined that NO_OF_GUESSES is below the threshold, $NO\_OF\_GUESSES_{THRESH}$, then flow proceeds to step S120 in which the resulting decision of the subroutine is set to indicate not to reset and not to hold and flow proceeds to the end of the subroutine.

The significance of this test is that if the number of guesses since the last reset (when the No-of-guesses variable is reset) is very low it is likely that the system is unstable and therefore it would be beneficial to allow the system to settle down a bit before attempting another reset. Additionally, immediately after doing a reset, it is likely that the perceived error will be much higher than before the reset. A few iterations should be permitted during which the estimated error should rapidly reduce as the estimated position moves towards a (hopefully) new minimum value.

If at step S115 it is determined that NO_OF_GUESSES is greater than $NO\_OF\_GUESSES_{THRESH}$, then flow passes to step S125.

At step S125 it is determined whether the value stored in a variable, ITS_SINCE_NEIGH_RESET, which stores the number of iterations elapsed since one of the present device's neighbours last reset, is below a threshold value, $ITS\_SINCE\_NEIGH\_RESETT_{THRESH}$, which, in the present example procedure is set to 1 (note it has been found that this threshold value should be kept low, but above zero, for the procedure to run well, preferably between 1 and 5). If it is determined that the number of iterations since a neighbour last reset is below the threshold value, then flow proceeds to step S130 in which the resulting decision of the subroutine is set to indicate not to reset but instead to hold and flow proceeds to the end of the subroutine.

The significance of this test is that if a neighbour has recently reset, it is likely that the recently reset neighbour does not have an accurate estimate of its position. As a result, it is useful to give the recently reset neighbouring node an opportunity to move towards a minimum in the perceived error function (and hence hopefully to a position which is closer to its actual position) before attempting to adjust the position of the present device on the basis of the error function which is likely to be heavily influenced by the recently reset node causing a large increase in the perceived error determined by the present device.

If at step S125 it is determined that the number of iterations since a neighbouring node last reset is greater than the threshold amount, then flow passes to step S135.

In step S135, a random number is chosen (using a simple random number generator such as is commonly available on microprocessors) to lie between zero and a predetermined maximum value, MAX, the value of which depends upon the average distance between nodes in the network. In the present example, the maximum value is calculated according to the following formula:

MAX=RANGE$^2$÷2500

In the simulated example, the average distance between nodes in the network is approximately 50 distance units and so RANGE was set to 50 giving a value for MAX of 1. Having selected a random number between zero and MAX, flow passes to step S140 in which it is determined, in the present example, whether the chosen random number is less than the "Average" error divided by the number of guesses since the present device was last reset (ie NO_OF_GUESSES) (note an alternative example could use some more complicated function of this ratio instead).

If the determination in step S140 is that the random number is not less than the "Average" error over NO_OF_GUESSES ratio, flow passes to step S145 in which the resulting decision of the subroutine is set to indicate not to reset but instead to hold and flow proceeds to the end of the subroutine. Otherwise, flow passes to step S150 in which the resulting decision of the subroutine is set to indicate to reset and flow proceeds to the end of the subroutine.

Note that the random number chosen in step S135 varies between 0 and 1 while the ratio of "Average" error over NO_OF_GUESSES varies potentially between 0 and a high number (ie much higher than 1). The significance of this is that when error is high, the present device will always reset, and this is desirable since high error is considered to be an indication of the present device failing to find a reasonable solution. It should also be noted that no reset will be made if the NO_OF_GUESSES is less than 20 since the subroutine would have terminated with a decision not to reset or hold after step S115.

Stated somewhat loosely, the overall effect of subroutine S60 is that if things are wrong then the present device will always reset, if given the chance (ie if the conditions specified in steps S105, S115 and S125 are satisfied such that flow proceeds to steps S135 and S140), if things are right the present device will never reset and if things are nearly right then the present device has a chance of resetting.

Figure 13:
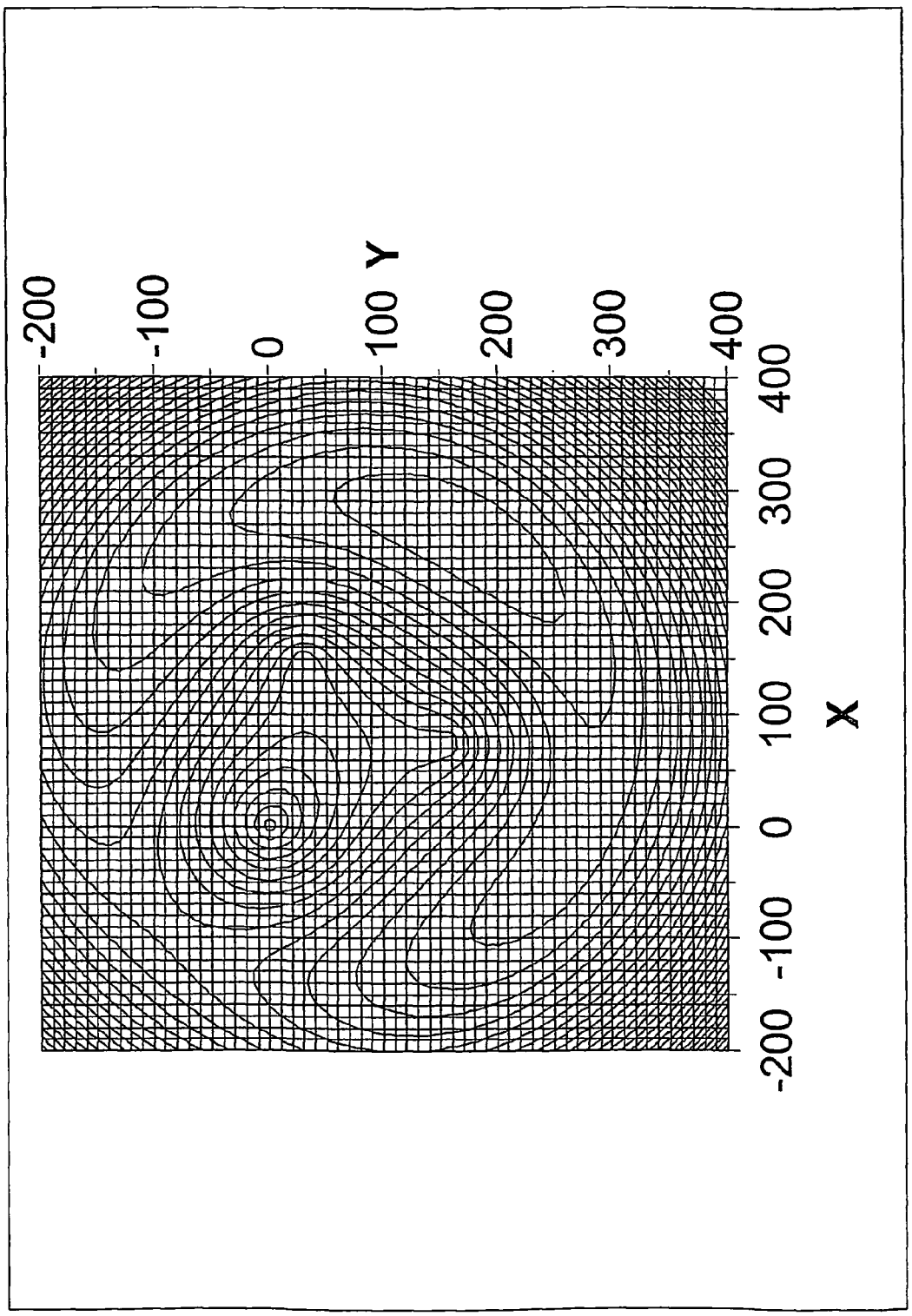
FIG. 13 is a contour graph of the error function versus position of a single node communicating with three neighbouring nodes.
Figure 14:
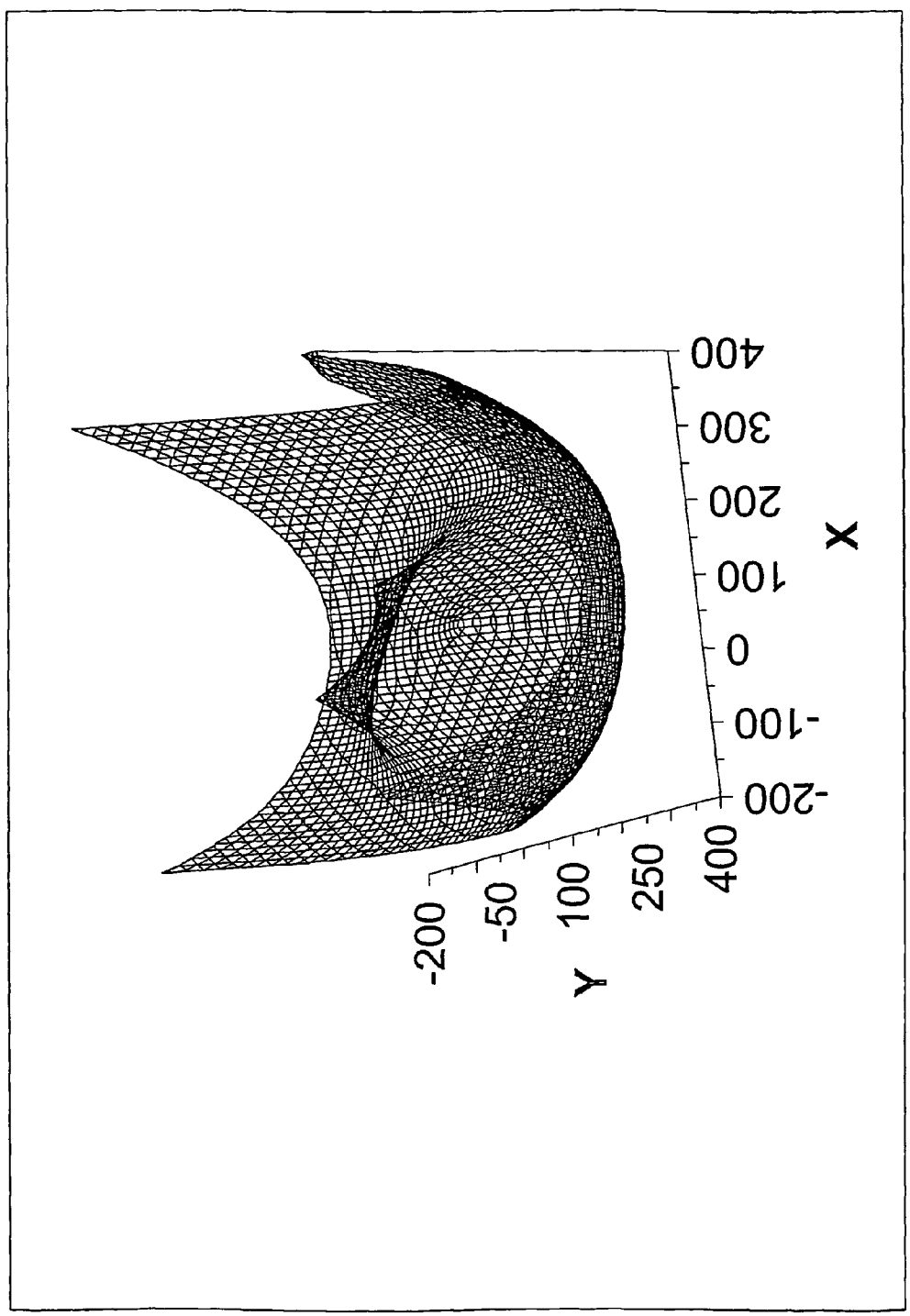
FIG. 14 is a three dimensional representation of the contour graph of FIG. 13.

FIGS. 13 and 14 illustrate the way in which the perceived error function, E, varies with position, by way of a contour map in FIG. 13 and a perspective view of a three-dimensional representation of the contour map in FIG. 14. The arrangement of nodes on which the contour map is based is one where the node who's contour map is drawn is actually located at x=200, y=200 and it can communicate with 3 other nodes at (0,0), (200,0) and (0,200). The node at (0,0) is an "a priori" node that knows its location at all times, the other 2 are random nodes which have guessed their locations (incorrectly) to be (150,30) and (75,162) respectively. From this the node who's contour map is shown will optimally guess a location which is in the region of lowest error (in the region around x=250, y=175). Depending on the exact type of procedure followed for arriving at the minimum, it can be seen that after a few iterations the guessed position would coincide with this global minimum.

Note that because the random neighbouring nodes have incorrectly guessed their positions, the global minimum does not quite coincide with the node's exact correct position. However, it is expected that the neighbouring random nodes will improve their guesses of their location in subsequent iterations and in doing so, the global minimum will move towards the correct position.

Figure 15:
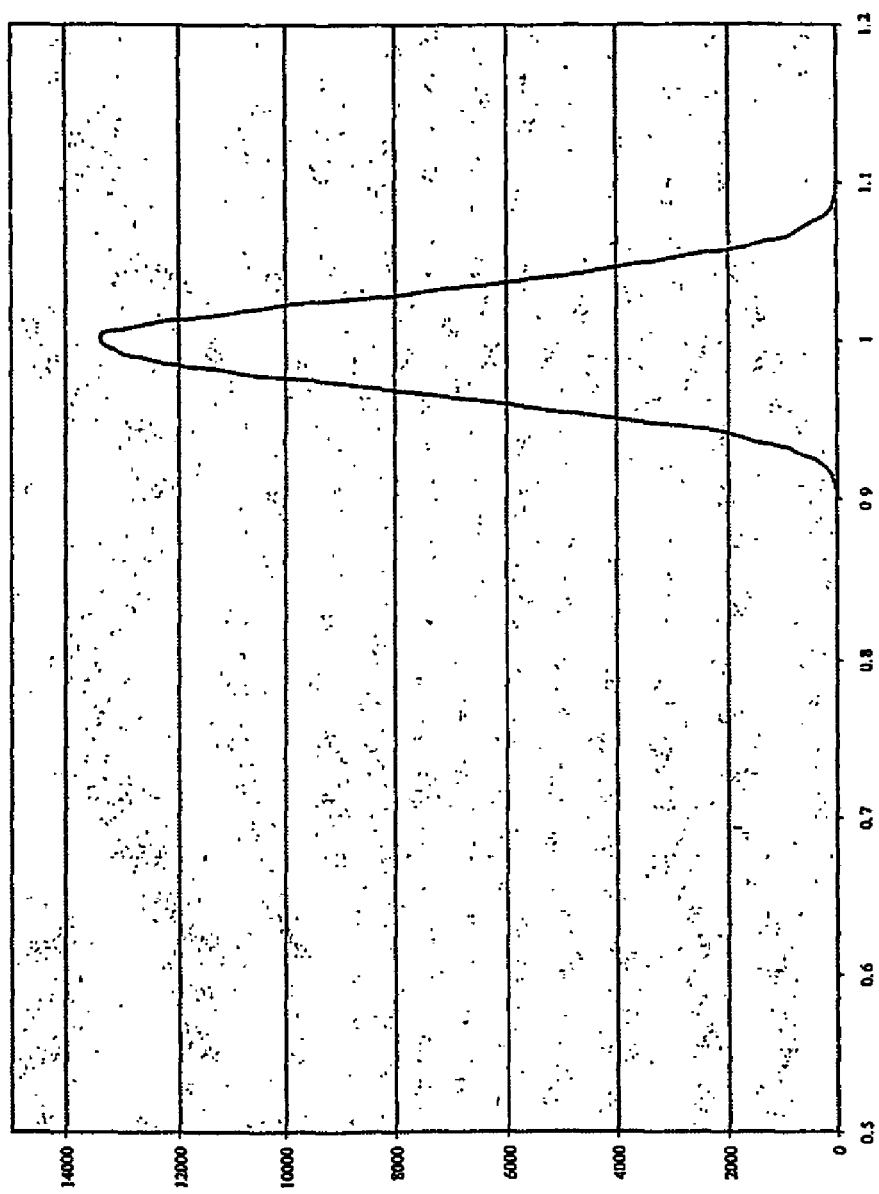
FIG. 15 is a plot of the noise function used to generate the graph of FIG. 17.

Referring now to FIG. 15, it was mentioned above that in the simulation described above in relation to FIGS. 1 to 4, a certain amount of noise (approximately 10%) in the measured distances was simulated. In the above described simulation, the noise was generated using the following function:

$$md = md_{true} \times R$$

$$R = (rand+rand+rand+rand)/20 + 0.9$$

where rand is a random number chosen from a uniform distribution between zero and one. Thus R is a random number between 0.9 and 1.1 having a distribution which is approximately Gaussian. FIG. 7 illustrates a plot of 100,000 values of R chosen using the above formula. In an alternative simulation in which a random number generator function having a Gaussian distribution was available, this could be used instead, with perhaps a variance of 10% of the mean instead of maximum and minimum values of plus and minus 10% of the mean respectively.

Figure 16:
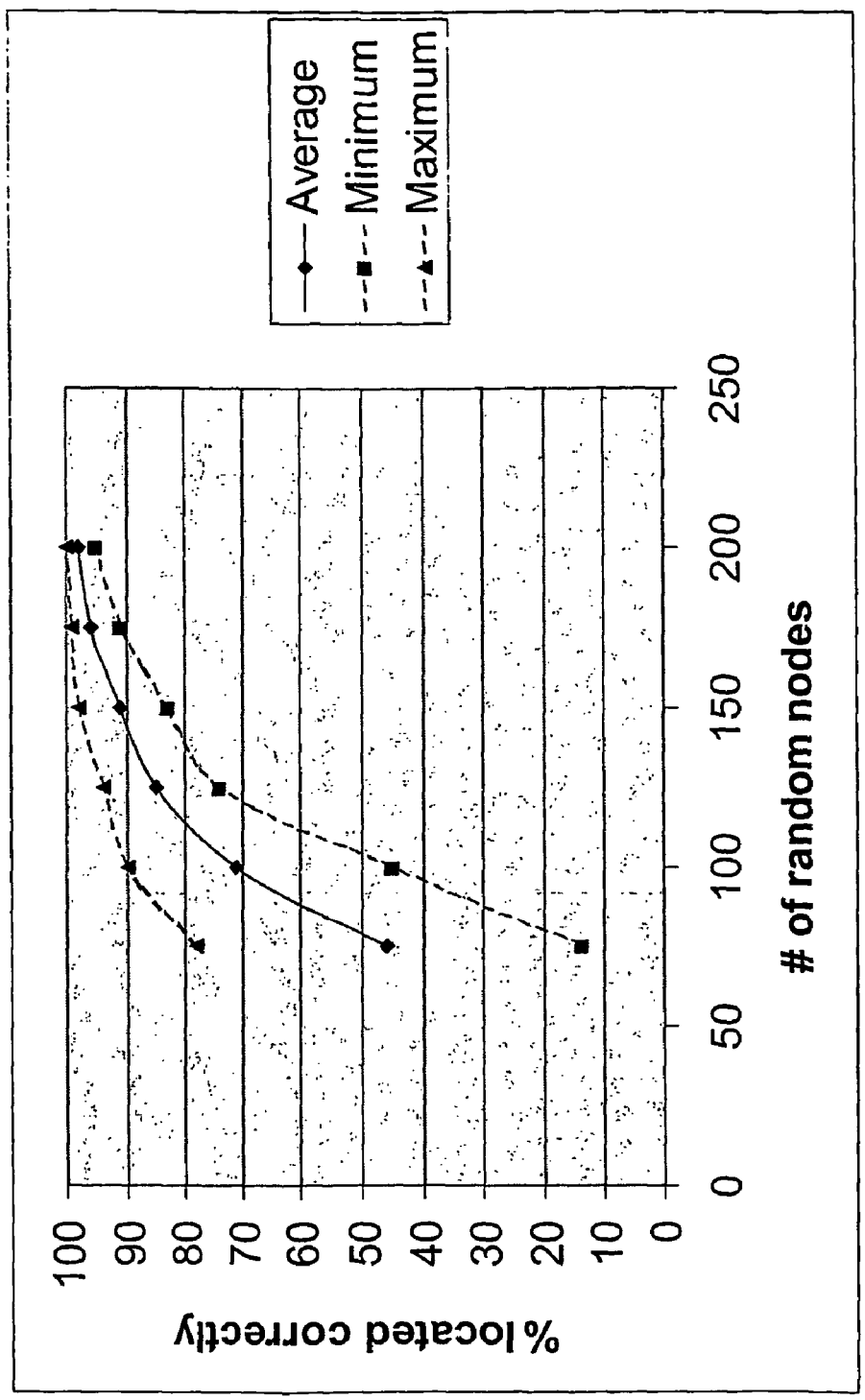
FIG. 16 is a graph showing the increase of the percentage of nodes which correctly estimate their position as a function of the total number of "random" nodes in the arrangement of FIG. 9 (having 16 nodes having a priori knowledge of their position)

FIG. 16 shows the results of performing a large number of simulations with differing numbers of random nodes and in many different arrangements (all with the "a priori" nodes arranged in the same grid structure as shown in FIGS. 9 and 10 but with different numbers and random arrangements of the random nodes) all with zero noise on the measured distances. It can be seen that with only 75 random nodes, the performance is very variable with, on average, just under half of the random nodes being able to successfully locate themselves, with a best result of just under 80% of nodes locating themselves successfully and a worst result of just over 10% locating themselves correctly. However, with 100 random nodes, the worst case is just under half of the nodes successfully locating themselves and the best case is exactly 90% with an average of just over 70%. At 125 random nodes (as in the example described in detail above with reference to FIGS. 9 to 12), the worst case is just over 70%, average is approximately 85% and best case is over 90%. Thereafter improvement is slower with increasing numbers of nodes until at 200 random nodes the worst case is about 95%, the average is just under 100% and the best result is 100% of random nodes correctly locating themselves.

Figure 17:
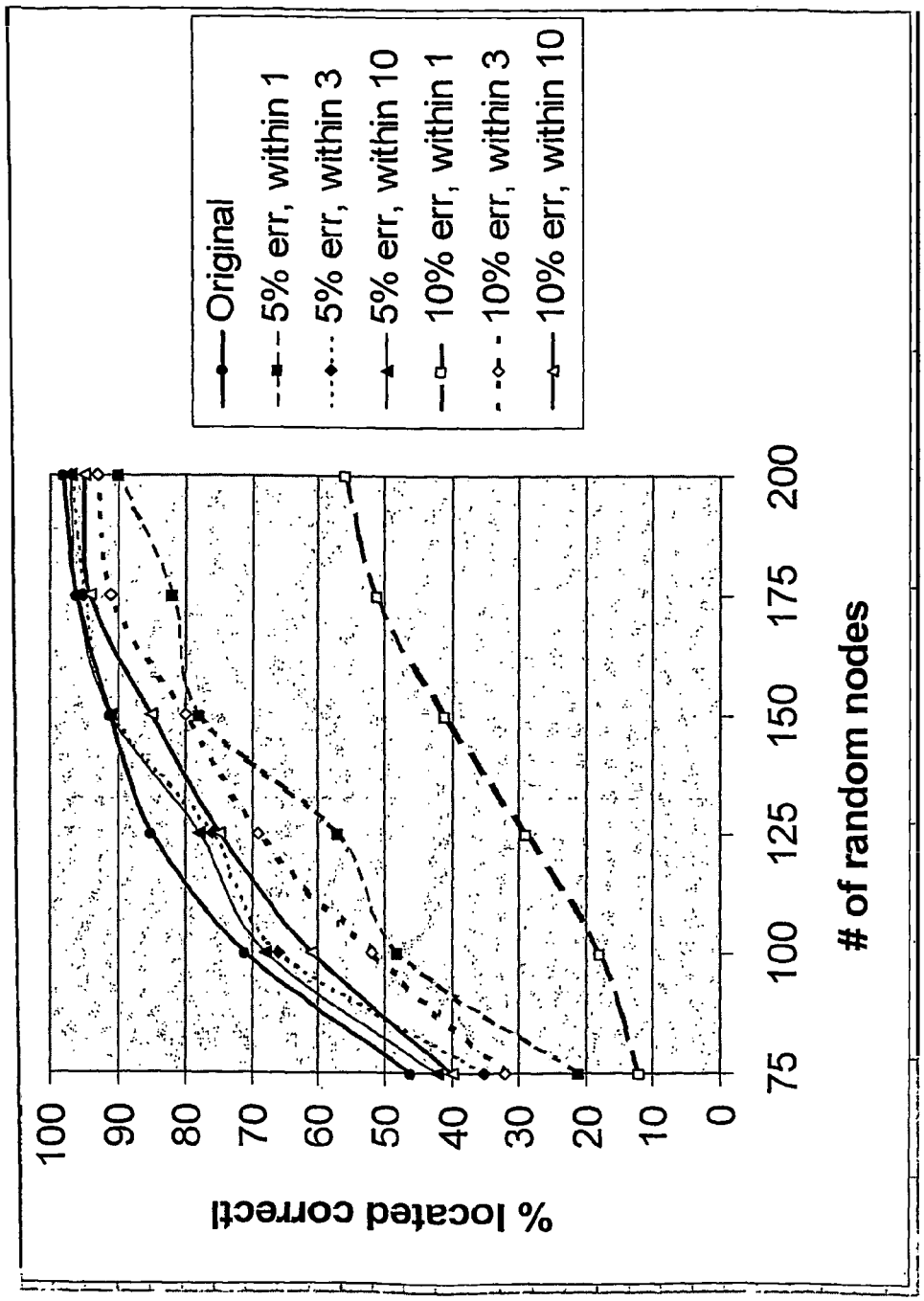
FIG. 17 is a graph similar to that of FIG. 16 showing the effects of noise introduced to the measurement of distance between neighbouring nodes.

FIG. 17 illustrates the effects of adding noise to the measured distances. It can be seen that adding noise has a detrimental effect on the ability of the nodes to successfully locate themselves. However, there is only a small detrimental effect on the ability of the nodes to locate themselves to within 10 distance units of their correct locations. Given that the whole grid has a size of 400 by 400 distance units (ie the "a priori" nodes are spaced 100 distance units apart) this illustrates that the reduced performance caused by noise on the measured distances is not great. In fact, from the Figure, it can be seen that even with 10% noise on the average percentage of nodes able to locate themselves within 10 distance units of their actual position is only about 5% less than the average percentage of nodes able to correctly locate themselves when there is no noise.

Variations

In an alternative preferred embodiment, each unit or node other than the "a priori" nodes maintains performs the above described method in respect of three different parallel estimated positions. This enables a level of confidence or estimated maximum error to be calculated whenever a definitive position estimate is required (eg for position-stamping data in the case of sensor devices such as that shown in FIG. 8).

As an example of this variation, consider each (non-a priori) node storing three different estimated positions in parallel. This then requires each node to store three sets of each of the following variables:

x, y, HAVE_RESET?, NO_OF_GUESSES, E, "Average" Error, and ITS_SINCE NEIGH_RESET.

This is conveniently done by making each of these variables an array having three variables each, each of which is accessible by means of an index, ie array $x = x_1, x_2, x_3$; etc.

When a device is required to generate a single position estimate, (x_bar, y_bar), from its array of different x and y positions, this is done, in this alternative embodiment, according to the following formula:

$$x\_bar = (x_1 + x_2 + x_3)/3; \; y\_bar = (y_1 + y_2 + y_3)/3$$

Furthermore, each device is also able to calculate a confidence level or estimated maximum error. In this alternative embodiment, this is done according to the following formula:

$$Est\_max\_Error = ((Max \; x - Min \; x) + (Max \; y - Min \; y))/2$$

where Max x is the largest of $x_1$, $x_2$ and $x_3$, and Min x is the smallest of these, etc.

Simulations have shown that for an extremely low density of nodes, the actual error is less than or equal to Est_max_Error about 90% of the time, for densities 50% higher than this, the probability rises to something like 98%. That means that 98% of nodes with a determined Est_max_Error less than 5 units have a real error less than or equal to 5 units, similarly about 98% of nodes with a determined Est_max_Error less than 10 units have a real error of less than 10 units and so on. In some circumstances, it is useful to provide a "normalised" Est_max_Error. This can be done by dividing Est_max_Error by the communications range of each device. Note that the term "extremely low density" of nodes referred to above, on which a probability of the Est_max_Error being greater than or equal to the actual error of 90% was found in simulations, refers to a density of 100 position determining nodes each with range 50 units randomly distributed onto a square grid of side 400 units; whilst "50% higher than this" density refers to 150 position determining nodes with the same range of 50 units on the same grid of size 400 units. For both of these cases, there were 16 position-aware a priori nodes distributed in a square-packed formation (as shown in FIG. 9).

As an indication of density in general, one may use an approximation of density, $\rho$, along the following lines:

$$\rho = N \cdot \pi (R_{COM})^2 / A_{GRID}$$

where N is the total number of nodes, $R_{COM}$ is the communications range of each node, and $A_{GRID}$ is the total grid area. Using this formula, an "extremely low density" corresponds to a $\rho$ of 5.7, whilst "50% higher than this" corresponds to a $\rho$ of 8.1.

The term approximate density is used because this number for $\rho$ approximates to the average number of connections a node will have. The approximation improves as the grid becomes larger relative to the communications range of each device, such that in the limit of the grid being infinitely larger than the range the approximation becomes exact. However, the edge effects of the grid in a real case mean that each node has, on average, fewer connections than the numbers quoted above.

In order to use this method of location in the case of devices which are able to move, the most important modification is to ensure that in the event of a change in the number of neighbours of a device, that the device does not immediately reset, thus giving the system a small time to settle down before taking drastic action (ie resetting). In order to do this, each device stores a further variable (note that this is one variable which does not need to be stored as an array of variables in the case that each device is manipulating a plurality of estimated positions in parallel, see above) which records the number of neighbours which it has (ie the number of devices with which the device is able to communicate directly, ie within its communications range). If it detects that this number changes from one iteration to the next, then it suppresses any decision to reset for a predetermined number of iterations.

The method of storing a single variable which simply stores the number of neighbours detected is an efficient solution. However, it does leave open the possibility of one neighbour leaving and another joining between detections which would not therefore result in a change in the number of neighbours and thus would not, in this embodiment, trigger an inhibition of the reset. It is considered that the number of times in which this would occur are so small that it would not significantly alter the performance of the method as a whole. Nonetheless, to avoid this problem an alternative embodiment could record not only the number of neighbouring nodes but also the identities of these nodes. The method could then act to inhibit a reset occurring in the event of any change in the group of neighbouring nodes be it a change in the number of nodes or simply a change in the identities of the nodes. In alternative embodiment, the reset procedure is inhibited only in the event of a new neighbouring node being detected and not when a former node moves out of range of the device, however, this arrangement is not preferred as any change in the constitution of the group of neighbouring nodes is likely to lead to instability which is best handled by causing the device to hold its current estimated location for at least one iteration.

In simulations it has been discovered that a suppression for one iteration is preferred. In cases where the predetermined number of iterations for suppressing resetting in the event of a change in the number of neighbours equals the predetermined number of iterations for suppressing resetting in the event of a neighbour resetting, the same mechanism can be used for enforcing both requirements by setting the ITS_SINCE_NEIGH_RESET to 0 in the event either of detecting a neighbour resetting or detecting a change in the number of neighbours. Note in this way a suppression of a reset for either reset by a neighbour or a change in the number of neighbours will preferably result in a "hold" decision being taken which avoids a new estimated position from being calculated and broadcast.

In the above described method with reference to FIGS. 11 and 12, it is clear that a two stage method is being adopted. The first stage generates a very approximate position estimate based on the measured distance from a single neighbour who has broadcast an estimated position. The second stage is then a sophisticated iterative procedure which results in all of the devices' position estimates typically improving significantly. This two stage procedure could advantageously be modified by replacing the initial stage by a more sophisticated procedure and/or one better suited to the particular system set-up in which the method is to be employed. For example, where devices have fairly accurate mechanisms for determining the distance between two devices which are within range of one another, the locating method described with reference to FIGS. 1 to 8 may be used to obtain initial position estimates and then once each device has obtained a single position estimate (or after a default number of iterations in which the device has been unable to reduce its number of position estimates), the device enters the second stage of position estimation improvement. This could be achieved, for example, by replacing step S15 in FIG. 11 with a more generic decision step of "has first stage been completed?" and steps S20 and S25 with steps for performing the first stage and determining when the first stage is deemed to have come to an end.

An alternative method for performing the first stage approximate position estimation would be the first stage method described in the papers by Savarese C et al. referred to in the introduction, in which each device determines how many hops away it is from its three (or four in three dimensional cases) nearest anchor or a priori nodes, estimates the average distance associated with each hop and triangulates to find an estimated position on the basis of its hop distance from these anchor nodes and the average length of each hop.

One further possible first stage method is similar to that mentioned above (the Savarese first stage method). In this method, each device determines how many hops it is away from at least two of its closest a priori nodes as is done in the Savarese method, and then it determines in respect of each of two (or three in the case of a three dimensional arrangement) orthogonal, or at least non-parallel (or non-planar in three dimensional arrangements) axes, the maximum distance interval along each axis which the present device could be located on the basis of the number of hops removed from the respective a priori node, assuming a maximum distance of the communications range, $R_{COM}$, in each direction away from the a priori node. The intervals formed in this way from different a priori nodes should overlap to generate a smaller interval within which the present device will be located along that particular axis. The two (or three in the case of three dimensional arrangements) intervals along different axes can then be used to form a square, or parallelogram for non-orthogonal axes, (or a cube or parallelepiped in three dimensional arrangements) within which the present device theoretically must be located. The first position estimate can then be chosen either to be the centre of this theoretical region within which the device must be located, or alternatively any position within the theoretical region may be selected at random. Using a random selection has the advantage that it is unlikely that any two devices will select the same initial estimated position even if they are in the "same position" in terms of the minimum number of hops to each of the closest a priori nodes.

As should be clear from the above discussion, all of the above described methods of the various different envisaged embodiments could be applied equally well to either a two-dimensional arrangement (eg sensors floating on a lake, sea, ocean etc.) or a three dimensional arrangement (eg sensors in a volcano, employee identification tags within a building, etc.), provided that the obvious extensions to three dimensions are carried out (eg position is stored as a triplet of x, y and z coordinates, etc.).

An alternative method might utilise information from more distant nodes than just the nearest neighbour nodes. This information could be obtained by having all nodes periodically broadcast information about the position of their nearest neighbours in addition to information about their own position or estimated position. This information could perhaps be used to encourage a reset where a node cannot communicate with a node which has located itself in a position which should be in communication range if the node was where it currently estimated itself to be (ie the node can attempt to reset to a position further away from the next-nearest neighbour).

APPENDIX

```
node 1 possn is 275, 76              (fixed 'gps' node)
node 2 possn is 118, 285             (fixed 'gps' node)
node 3 possn is 88, 308              (fixed 'gps' node)
node 4 possn is 127, 64
node 5 possn is 148, 170
node 6 possn is 32, 189
node 7 possn is 28, 336
node 8 possn is 23, 117
node 9 possn is 366, 147
node 10 possn is 309, 131
node 11 possn is 287, 122
node 12 possn is 65, 131
total # of nodes visible to node 4 is 4      (they are nodes 1, 5, 8 & 12)
total # of nodes visible to node 5 is 6      (they are nodes 11, 4, 12, 8, 6 & 2)
total # of nodes visible to node 6 is 6      (they are nodes 8, 7, 2, 3, 5 & 12)
total # of nodes visible to node 7 is 3      (they are nodes 2, 3 & 6)
total # of nodes visible to node 8 is 4      (they are nodes 6, 5, 12 & 4)
total # of nodes visible to node 9 is 3      (they are nodes 1, 10 & 11)
total # of nodes visible to node 10 is 3     (they are nodes 1, 9, 11)
total # of nodes visible to node 11 is 4     (they are nodes 5, 1, 10 & 9)
total # of nodes visible to node 12 is 4     (they are nodes 4, 8, 6 & 5)
```

First round of location determination:

node 6 locating . . .

from nodes 2 & 3 node 6 located at either:
x = 32, y = 189 or x = 188, y = 393
node 7 locating . . .

from nodes 2 & 3 node 7 located at either:
x = 28, y = 336 or x = 45, y = 359
UPDATING . . .

Node 1 already fixed near x = 275, y = 76
Node 2 already fixed near x = 118, y = 285
Node 3 already fixed near x = 88, y = 308
updating node 6s # of positions to 2      (32, 189; 188, 393)
updating node 7s # of positions to 2      (28, 336; 45, 359)

Second round of location determination:

node 5 locating . . .

from nodes 2 & 6 node 5 located at either:    (posn 1(of 1) of node 2 and posn 1(of 2) node 6)
x = 148, y = 170 or x = 0, y = 302
from nodes 2 & 6 node 5 located at either:    (posn 1(of 1) of node 2 and posn 2(of 2) node 6)
x = 71, y = 394 or x = 237, y = 286
node 6 locating . . .

from nodes 2 & 3 node 6 located at either:
x = 32, y = 189 or x = 188, y = 393
node 7 locating . . .

from nodes 2 & 3 node 7 located at either:
x = 28, y = 336 or x = 45, y = 359

APPENDIX-continued

UPDATING . . .

Node 1 already fixed near x = 275, y = 76
Node 2 already fixed near x = 118, y = 285
Node 3 already fixed near x = 88, y = 308
updating node 5s # of positions to 4     (148, 170; 0, 302; 71, 394; 237, 286)
updating node 6s # of positions to 2     (32, 189; 188, 393)
updating node 7s # of positions to 2     (28, 336; 45, 359)
located = 3, partial = 3

Third round of location determination node 4 locating . . .

from nodes 1 & 5 node 4 located at either:   (posn 1(of 1) of node 1 and posn 1(of 4) node 5)
x = 127, y = 64 or x = 243, y = 221
from nodes 1 & 5 node 4 located at either:   (posn 1(of 1) of node 1 and posn 4(of 4) node 5)
x = 183, y = 192 or x = 320, y = 217
(for positions 2 & 3 of node 5 there are no intersections of
the circles and hence no possible solutions. This information
will be passed to node 5 in the next round of communications)
node 5 locating . . . (As in previous round of location determination)

from nodes 2 & 6 node 5 located at either:
x = 148, y = 170 or x = 0, y = 302
from nodes 2 & 6 node 5 located at either:   •
x = 71, y = 394 or x = 237, y = 286
node 6 locating . . .

from nodes 2 & 3 node 6 located at either:
x = 32, y = 189 or x = 188, y = 393
node 7 locating . . .

from nodes 2 & 3 node 7 located at either:
x = 28, y = 336 or x = 45, y = 359
node 8 locating . . .

from nodes 5 & 6 node 8 located at either:   (posn 1(of 4) of node 5 and posn 1(of 2 node 6)
x = 23, y = 117 or x = 46, y = 260
from nodes 5 & 6 node 8 located at either:   (posn 2(of 4) of node 5 and posn 1(of 2) of node 6)
x = 101, y = 211 or x = 39, y = 172
from nodes 5 & 6 node 8 located at either:   (posn 3(of 4) of node 5 and posn 2(of 2) of node 6)
x = 186, y = 466 or x = 185, y = 320
from nodes 5 & 6 node 8 located at either:   (posn 4(of 4) of node 5 and posn 2(of 2) of node 6)
x = 123, y = 361 or x = 256, y = 420
(The combinations of positions 3 or 4 of node 5 with position 2 of node 6 and
positions 1 or 2 of node 5 with position 2 of node 6 are incapable of
producing solutions)
node 11 locating . . .

from nodes 1 & 5 node 11 located at either:   (posn 1(of 1) of node 1 and posn 1(of 4) of node 5)
x = 235, y = 51 or x = 287, y= 122
(positions 2–4 of node 5 produce no solutions)
node 12 locating . . .

from nodes 5 & 6 node 12 located at either:   (posn 1( of 4) of node 5 and posn 1(of 2) of node 6)
x = 65, y = 131 or x = 82, y = 233
from nodes 5 & 6 node 12 located at either:   (posn 2(of 4) of node 5 and posn 1(of 2) of node 6)
x = 71, y = 243 or x = 29, y = 215
from nodes 5 & 6 node 12 located at either:   (posn 3(of 4) of node 5 and posn 2(of 2) of node 6)
x = 147, y = 445 or x = 146, y = 341
from nodes 5 & 6 node 12 located at either:   (posn 4(of 4) of node 5 and posn 2(of 2) of node 6)
x = 158, y = 333 or x = 253, y = 376
(As node 8)
UPDATING . . .

Node 1 already fixed near x = 275, y = 76
Node 2 already fixed near x = 118, y = 285
Node 3 already fixed near x = 88, y = 308
updating node 4s # of positions to 4     (127, 64; 243, 221; 183, 192; 320, 217)
updating node 5s # of positions to 4     (148, 170; 0, 302; 71, 394; 237, 286)
updating node 6s # of positions to 2     (32, 189; 188, 393)
updating node 7s # of positions to 2     (28, 336; 45, 359)
updating node 8s # of positions to 8     (23, 117; 46, 260; 101, 211; −39, 172;
                                                      186, 466; 185, 320; 123, 361; 256, 420)
updating node 11s # of positions to 2    (235, 51; 287, 122)
updating node 12s # of positions to 8    (65, 131; 82, 233; 71, 243; −29, 215;
                                                      147, 445; 146, 341; 158, 333; 253, 376)

located = 3, partial = 7

APPENDIX-continued

Fourth round of location determination:

node 4 locating . . .

| from nodes 1 & 5 node 4 located at either:<br>x = 127; y = 64 or x = 243, y = 221 | (posn 1(of 1) of node 1 and posn 1(of 4) of node 5) |
|---|---|
| from nodes 1 & 5 node 4 located at either:<br>x = 183, y = 192 or x = 320, y = 217 | (posn 1(of 1) of node 1 and posn 4(of 4) of node 5) |
| x = 243 y = 221 is inconsistent | (& eliminated) |
| x = 183 y = 192 is inconsistent | (& eliminated) |
| x = 320 y = 217 is inconsistent | (& eliminated) | node 5 locating . . .

| from nodes 2 & 6 node 5 located at either:<br>x = 148, y = 170 or x = 0, y = 302 | (posn 1(of 1) of node 2 and posn 1(of 2) of node 6) |
|---|---|
| from nodes 2 & 6 node 5 located at either:<br>x = 71, y = 394 or x = 237, y = 286 | (posn 1(of 1) of node 2 and posn 2(of 2) of node 6) |
| x = 0 y = 302 is inconsistent | (& eliminated) |
| x = 71 y = 394 is inconsistent | (& eliminated) |
| x = 237 y = 286 is inconsistent | (& eliminated) | node 6 locating . . .

from nodes 2 & 3 node 6 located at either:
x = 32, y = 189 or x = 188, y = 393 node 7 locating . . .

from nodes 2 & 3 node 7 located at either:
x = 28, y = 336 or x = 45, y = 359 node 8 locating . . .

| from nodes 4 & 6 node 8 located at either:<br>x = 23, y = 117 or x = 104, y = 178 | (posn 1(of 4) of node 4 and posn 1(of 2) of node 6) |
|---|---|
| from nodes 4 & 6 node 8 located at either:<br>x = 182, y = 321 or x = 235, y = 337 | (posn 2(of 4) of node 4 and posn 2(of 2) of node 6) |
| from nodes 4 & 6 node 8 located at either:<br>x = 81, y = 135 or x = 78, y = 245 | (posn 3(of 4) of node 4 and posn 1(of 2) of node 6) |
| x = 104 y = 178 is inconsistent | (& eliminated) |
| x = 182 y = 321 is inconsistent | (& eliminated) |
| x = 235 y = 337 is inconsistent | (& eliminated) |
| x = 81 y = 135 is inconsistent | (& eliminated) |
| x = 78 y = 245 is inconsistent | (& eliminated) |

(The choice to locate using nodes 4 & 6 here instead of nodes 5 & 6 as was done in round 3 is purely arbitrary. In this case it is true that there are only 6 possible solutions to the combination of nodes 4 & 6 (of which 5 are subsequently eliminated) as opposed to 8 for nodes 5 & 6. However, there are 16 (N=2, M=4, 2NM=16) possible solutions to the equations produced by nodes 4 & 6 based on the information available to node 8, the same number as is possible from nodes 5 & 6. It is only by attempting to solve these equations that node 8 is able to determine that not all of the solutions are REAL (i.e. complex solutions are those solutions whereby the circles do not intersect). It is by luck rather than judgement that node 8 has chosen to initially find real solutions to the equations created by nodes 4 & 6 (6 Real, complex solutions) rather than those from nodes 5 & 6 (8 Real, 8 complex), and then work to eliminate them. In any case, the result would be the same with nodes 4 & 6 the 6 possible solutions have 5 eliminated, if the 8 possible solutions of nodes 5 & 6 were calculated, 7 would be eliminated leaving the same solution.)

node 9 locating . . .

| from nodes 1 & 11 node 9 located at either:<br>x = 234, y = −32 or x = 160, y = 88 | (posn 1(of 1) of node 1 and posn 1(of 2) of node 11) |
|---|---|
| from nodes 1 & 11 node 9 located at either:<br>x = 230, y = 182 or x = 366, y = 147 | (posn 1(of 1) of node 1 and posn 2(of 2) of node 11) | node 10 locating . . .

| from nodes 1 & 11 node 10 located at either:<br>x = 232, y = 27 or x = 212, y = 60 | (posn 1(of 1) of node 1 and posn 1(of 2) of node 11) |
|---|---|
| from nodes 1 & 11 node 10 located at either:<br>x = 272, y = 141 or x = 309, y = 131 | (posn 1(of 1) of node 1 and posn 2(of 2) of node 11) | node 11 locating . . .

| from nodes 1 & 5 node 11 located at either:<br>x = 235, y = 51 or x = 287, y = 122 | (posn 1(of 1) of node 1 and posn 1(of 4) of node 5) |
|---|---|

-continued node 12 locating . . .

from nodes 4 & 6 node 12 located at either:  (posn 1(of 4) of node 4 and posn 1(of 2) of node 6)
x = 65, y = 131 or x = 79, y = 142
from nodes 4 & 6 node 12 located at either:  (posn 3(of 4) of node 4 and posn 1(of 2) of node 6)
x = 95, y = 167 or x = 94, y = 214
x = 79 y = 142 is inconsistent
x = 95 y = 167 is inconsistent
x = 94 y = 214 is inconsistent
UPDATING . . .

Node 1 already fixed near x = 275, y = 76
Node 2 already fixed near x = 118, y = 285
Node 3 already fixed near x = 88, y = 308
updating node 4s # of positions to 1
Node 4 fixed near x = 127, y = 64
updating node 5s # of positions to 1
Node 5 fixed near x = 148, y = 170
updating node 6s # of positions to 2        (32, 189; 188, 393)
updating node 7s # of positions to 2        (28, 336; 45, 359)
updating node 8s # of positions to 1
Node 8 fixed near x = 23, y = 117
updating node 9s # of positions to 4        (234, −32; 160, 88; 230, 182; 366, 147)
updating node 10s # of positions to 4       (232, 27; 212, 60; 272, 141; 309, 131)
updating node 11s # of positions to 2       (235, 51; 287, 122)
updating node 12s # of positions to 1
Node 12 fixed near x = 65, y = 131
located = 7, partial = 5

Fifth Round of location determination:

node 6 locating . . .

from nodes 2 & 3 node 6 located at either:
x = 32, y = 189 or x = 188, y = 393
x = 188 y = 393 is inconsistent
node 7 locating . . .

from nodes 2 & 3 node 7 located at either:
x = 28; y = 336 or x = 45, y = 359
node 9 locating . . .

from nodes 1 & 11 node 9 located at either:
x = 234, y = −32 or x = 160, y = 88
from nodes 1 & 11 node 9 located at either:
x = 230, y = 182 or x = 366, y = 147
node 10 locating . . .

from nodes 1 & 11 node 10 located at either:
x = 232, y = 27 or x = 212, y = 60
from nodes 1 & 11 node 10 located at either:
x = 272, y = 141 or x = 309, y = 131
node 11 locating . . .

from nodes 1 & 5 node 11 located at either:
x = 235, y = 51 or x = 287, y = 122
UPDATING . . .

Node 1 already fixed near x = 275, y = 76
Node 2 already fixed near x = 118, y = 285
Node 3 already fixed near x = 88, y = 308
Node 4 already fixed near x = 127, y = 64
Node 5 already fixed near x = 148, y = 170
updating node 6s # of positions to 1
Node 6 fixed near x = 32, y = 189
updating node 7s # of positions to 2        (28, 336; 45, 359)
Node 8 already fixed near x = 23, y = 117
updating node 9s # of positions to 4        (234, −32; 160, 88; 230, 182; 366, 147)
updating node 10s # of positions to 4       (232, 27; 212, 60; 272, 141; 309, 131)
updating node 11s # of positions to 2       (235, 51; 287, 122)
Node 12 already fixed near x = 65, y = 131
located = 8, partial = 4

Sixth Round of location determination:

node 7 locating . . .

from nodes 2 & 3 node 7 located at either:
x = 28, y = 336 or x = 45, y = 359
x = 45 y = 359 is inconsistent -continued

```
node 9 locating . . .

from nodes 1 & 11 node 9 located at either:
x = 234, y = -32 or x = 160, y = 88
from nodes 1 & 11 node 9 located at either:
x = 230, y = 182 or x = 366, y = 147
node 10 locating . . .

from nodes 1 & 11 node 10 located at either:
x = 232, y = 27 or x = 212, y = 60
from nodes 1 & 11 node 10 located at either:
x = 272, y = 141 or x = 309, y = 131
node 11 locating . . .

from nodes 1 & 5 node 11 located at either:
x = 235, y = 51 or x = 287, y = 122
UPDATING . . .

Node 1 already fixed near x = 275, y = 76
Node 2 already fixed near x = 118, y = 285
Node 3 already fixed near x = 88, y = 308
Node 4 already fixed near x = 127, y = 64
Node 5 already fixed near x = 148, y = 170
Node 6 already fixed near x = 32, y = 189
updating node 7s # of positions to 1
Node 7 fixed near x = 28, y = 336
Node 8 already fixed near x = 23, y = 117
updating node 9s # of positions to 4      (234, -32; 160, 88; 230, 182; 366, 147)
updating node 10s # of positions to 4     (232, 27; 212, 60; 272, 141; 309, 131)
updating node 11s # of positions to 2     (235, 51; 287, 122)
Node 12 already fixed near x = 65, y = 131
located = 9, partial = 3
No farther improvements possible.
```

The invention claimed is:

1. A method of estimating the location of a device within a network of devices each of which forms a node of the network such that the device may communicate with any other node in the network either directly or indirectly via intermediate devices, the device within the network with which the device may communicate directly being referred to as a neighbouring node, the method including the steps of:

obtaining information specifying the location or estimated location of one or more of the neighbouring node or nodes;

measuring the distance from the device to said one or more neighbouring nodes;

iteratively modifying an estimated location of the device, so as to reduce an error function based on the inconsistency between the estimated location of the device and the location or estimated location of the one or more neighbouring nodes, as determined from the obtained information specifying the location or estimated location of the one or more neighbouring nodes, on the one hand and the measured distance or distances from the device to the one or more neighbouring nodes on the other hand; and periodically determining whether or not to implement a reset procedure, on the basis of whether or not certain conditions are met, by which the estimated location of the device is reset to a new location in a manner which does not seek to reduce the error function in respect of the new location relative to the immediately preceding estimated location of the device, whereby the device can avoid getting its estimated location stuck in a position corresponding to a local minimum value of the error function.

2. A method as claimed in claim 1 wherein the error function depends on the square, or the sum of the squares, of the difference or differences between the one or more hypothetical distances from the device to the one or more neighbouring nodes on the one hand and the measured distance from the device to the one or more respective neighbouring nodes on the other hand, where the hypothetical distance from the device to a neighbouring node is the distance between the estimated position of the device and the location or estimated location of the respective neighbouring node as obtained.

3. A method as claimed in either preceding claim wherein the network is a wireless ad-hoc network, and wherein the device communicates with the one or more of its neighbouring nodes in a wireless manner.

4. A method as claimed in claim 1 wherein the network is a mobile wireless ad-hoc network, and wherein the method includes maintaining a record of the number of neighbouring nodes, that is nodes with whom the device may communicate directly, and, in the event of detecting a change in the number of neighbouring nodes, inhibiting the reset procedure from occurring for a predetermined number of iterations.

5. A method as claimed in claim 1 wherein the step of periodically determining whether or not to implement a reset procedure includes choosing whether or not to implement the reset procedure in a pseudo-probabilistic manner such that the pseudo-probability of implementing the reset procedure is reduced as the ratio of the number of iterations since a reset was last performed to the error function is increased, at least beyond, between or before a certain minimum and/or maximum value of this ratio.

6. A method as claimed in claim 1, wherein the reset procedure chooses a new location for the estimated position of the device according to the following steps: attempting to identify the two closest nodes to the device; and setting the new location to be the mirror image location of the current estimated position of the device reflected in the line joining the two nodes identified in the preceding step.

7. A carrier medium carrying a computer program comprising processor implementable instructions for causing a device to carry out the method of claim 1 during implementation of the instructions.

8. A device for forming a node within a network of similar devices, the device including locating means for estimating its location, the locating means including:
   obtaining means for obtaining information specifying the location or estimated location of one or more neighbouring nodes;
   distance measurement means for measuring the distance to said one or more neighbouring nodes; and
   processing means for iteratively modifying an estimated location of the device, such as to reduce the inconsistency between the estimated location of the device and the location or estimated location of the one or more neighbouring nodes, as determined from the obtained information specifying the location or estimated location of the one or more neighbouring nodes, on the one hand and the measured distances to each of the one or more neighbouring nodes on the other hand;
   said processing means further including means for determining whether or not to reset the estimated location of the device if certain conditions are met to a location determined according to a procedure which does not seek to reduce inconsistency in the current iteration, whereby the device can avoid getting its estimated location stuck in a local minimum value of inconsistency.

9. A method of obtaining positional information about individual wireless devices within a wireless ad-hoc network including a plurality of position determining devices in which each position determining device includes means for estimating the distance between itself and any other similar device forming part of the network which is within range, devices which are in range of one another hereinafter being referred to as neighbouring devices, the method including the steps of:
   i) each position determining device receiving a broadcast message from each of its neighbouring devices specifying, if known, the respective neighbouring device's position or estimated position;
   ii) each position determining device attempting to measure its distance from each of its neighbouring devices;
   iii) each position determining device determining its actual position or an initial estimated position and storing this information;
   iv) each position determining device which does not know its actual position calculating the hypothetical distance between its estimated position and the position or estimated position of each neighbouring device whose broadcast position or estimated position has been received and whose distance from the respective node has been measured in step ii);
   v) each position determining device which does not know its actual position comparing the hypothetical distance calculated in step iv) with the distance measured in step ii);
   vi) each position determining device which does not know its actual position, evaluating an error function which depends on the difference between the hypothetical and measured distances;
   vii) each position determining device which does not know its actual position determining whether or not to implement a reset procedure on the basis of whether or not certain conditions are met, by which the estimated location of the device is reset to a new location in a manner which does not seek to reduce the error function in respect of the new location relative to the current estimated location of the device, whereby the device can avoid getting its estimated location stuck in a position corresponding to a local minimum value of the error function;
   viii) each position determining device which does not know its actual position modifying its estimated position, in the event that it is determined to not implement a reset procedure in step vii), so as to reduce the error function; and
   ix) each position determining device broadcasting to each other similar device in range, if known, its actual position determined in step iii) or its modified estimated position determined in step vii) or viii).

* * * * *